(12) United States Patent
Demma

(10) Patent No.: US 7,443,257 B2
(45) Date of Patent: Oct. 28, 2008

(54) MECHANICAL OSCILLATOR CONTROL ELECTRONICS

(75) Inventor: Nick Anthony Demma, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 597 days.

(21) Appl. No.: 10/908,034

(22) Filed: Apr. 26, 2005

(65) Prior Publication Data

US 2006/0238260 A1 Oct. 26, 2006

(51) Int. Cl.
*H03L 7/00* (2006.01)
(52) U.S. Cl. .................. 331/116 M; 331/10; 74/5.4
(58) Field of Classification Search ............ 74/5.4; 331/10, 116 M
See application file for complete search history.

(56) References Cited

U.S. PATENT DOCUMENTS

| | | | |
|---|---|---|---|
| 4,258,579 A * | 3/1981 | Olbrechts | .......... 74/5.37 |
| 4,331,263 A | 5/1982 | Brown | |
| 5,272,922 A | 12/1993 | Watson | |
| 6,067,858 A | 5/2000 | Clark et al. | |
| 6,164,134 A | 12/2000 | Cargille | |
| 6,250,156 B1 | 6/2001 | Seshia et al. | |
| 6,311,555 B1 | 11/2001 | McCall et al. | |
| 6,481,283 B1 | 11/2002 | Cardarelli | |
| 6,671,648 B2 | 12/2003 | McCall et al. | |
| 6,675,630 B2 | 1/2004 | Challoner et al. | |
| 2002/0020219 A1 | 2/2002 | DeRoo et al. | |
| 2003/0033850 A1 | 2/2003 | Challoner et al. | |
| 2003/0084722 A1 | 5/2003 | Kim et al. | |

FOREIGN PATENT DOCUMENTS

| EP | 1164353 | 12/2001 |
|---|---|---|
| WO | 2004020948 | 3/2004 |

\* cited by examiner

*Primary Examiner*—Joseph Chang
(74) *Attorney, Agent, or Firm*—McDonnell Boehnen Hulbert & Berghoff LLP

(57) ABSTRACT

A control system for a mechanical oscillator having a sinusoidal drive signal with a frequency that is a fractional multiple of a frequency of a signal of the mechanical oscillator. The drive signal may be in phase and in registration with the signal from the mechanical oscillator. A sense signal may be picked off from the oscillator and be demodulated to obtain a parameter sensed by the oscillator. The drive signal to the oscillator may be selected or blanked out while receiving and demodulating the sense signal.

20 Claims, 21 Drawing Sheets

SINE OSC

MECHANICAL OSCILLATOR CONTROL ELECTRONICS

BACKGROUND

The invention pertains to electronic control and particularly providing clean or noiseless electronic signals for the electronics. More particularly, the invention pertains to providing such signals for control and the drive of micromachined electromechincal (MEMS) gyroscopes.

SUMMARY

An approach for using a voltage controlled oscillator (VCO) to provide a clock frequency for the microcontroller that generates the demodulator signals may avoid many errors. The same code runs on the microcontroller, regardless of the frequency of the sensor and the loop filter, may assure sure that the signals coming out of the demodulator are such as to provide a loop lock with no phase error, so that the delay in the switches is automatically compensated for. A description of the digital VCO, as such, may be imprecise because it is digital only in that the output consists of 1's and 0's. The VCO may be analog in the sense that an analog signal enters the VCO and the frequency is not quantized but can take on any value within the range of the oscillator. The schematic of the electronics illustrates an implementation of the invention. However, the analog aspect of the analog portions of the control electronics may be digitalized with signal processing.

DESCRIPTION

There may be a need for low cost micro-machined electromechanical (MEMS) gyroscopes with navigation grade performance. One prerequisite for such performance may be refined control electronics for the gyroscopes. An implementation using a digital signal processor (DSP) may consist of a DSP running at some fixed clock frequency with software that somehow accounts for the frequency of the sensor and creates an appropriate motor drive signal for the gyroscope. The motor or oscillator drive signal from the DSP may be a synthetic sinusoidal or sine wave generated digitally. The motor drive signal may be synchronized with a motor pickoff signal. Also, the motor drive signal may be fractional multiple frequency of the motor pickoff signal. Such an implementation may have errors associated with the fact that transitions occur only at the edges of the clock signals in digital systems. There may also be errors due to data latency and the limited precision of the analog-to-digital converters that are used to convert the analog signals from the gyroscope into digital information. These data latencies and/or errors may be effectively compensated or eliminated with digital signal processing.

Figure 1:
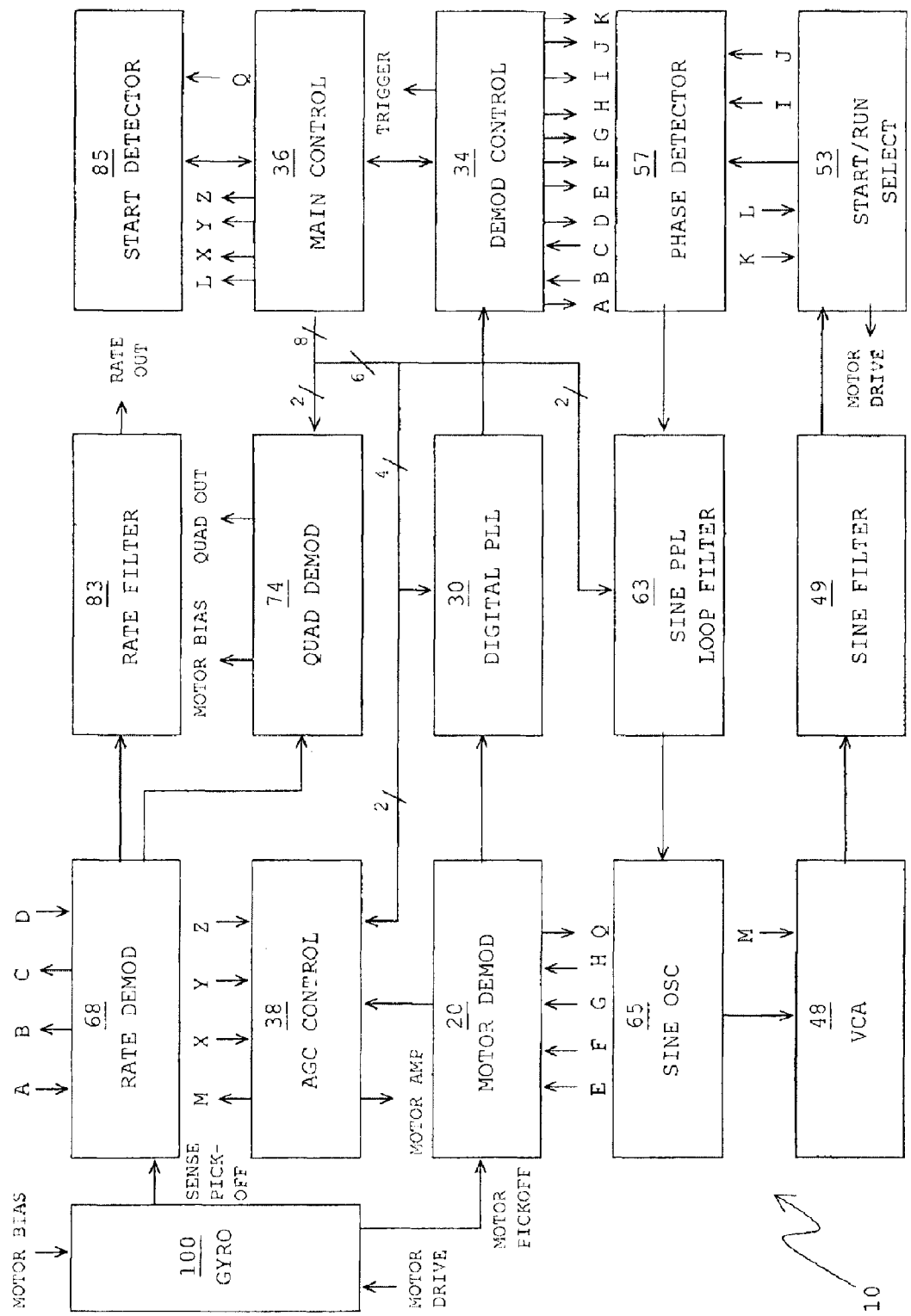
FIG. 1 is a block diagram of control electronics for a gyroscope.

FIGS. 1-16 are block and circuit drawings of a control electronics circuit 10 for a gyroscope. For an overview of how the circuit 10 operates, one may start by assuming that all the loops are closed and everything is running already. FIG. 1 is a block diagram of the overall circuit 10. FIGS. 2-14 show various circuits having identifiable connections among them such that the circuit diagrams may be put together to provide a schematic of the electronics circuit 10. A configuration of circuit 10 is shown in FIG. 1; however, there be variants of that configuration, such as circuit 210 in FIG. 17, which may used to implement the present invention.

Figure 2:
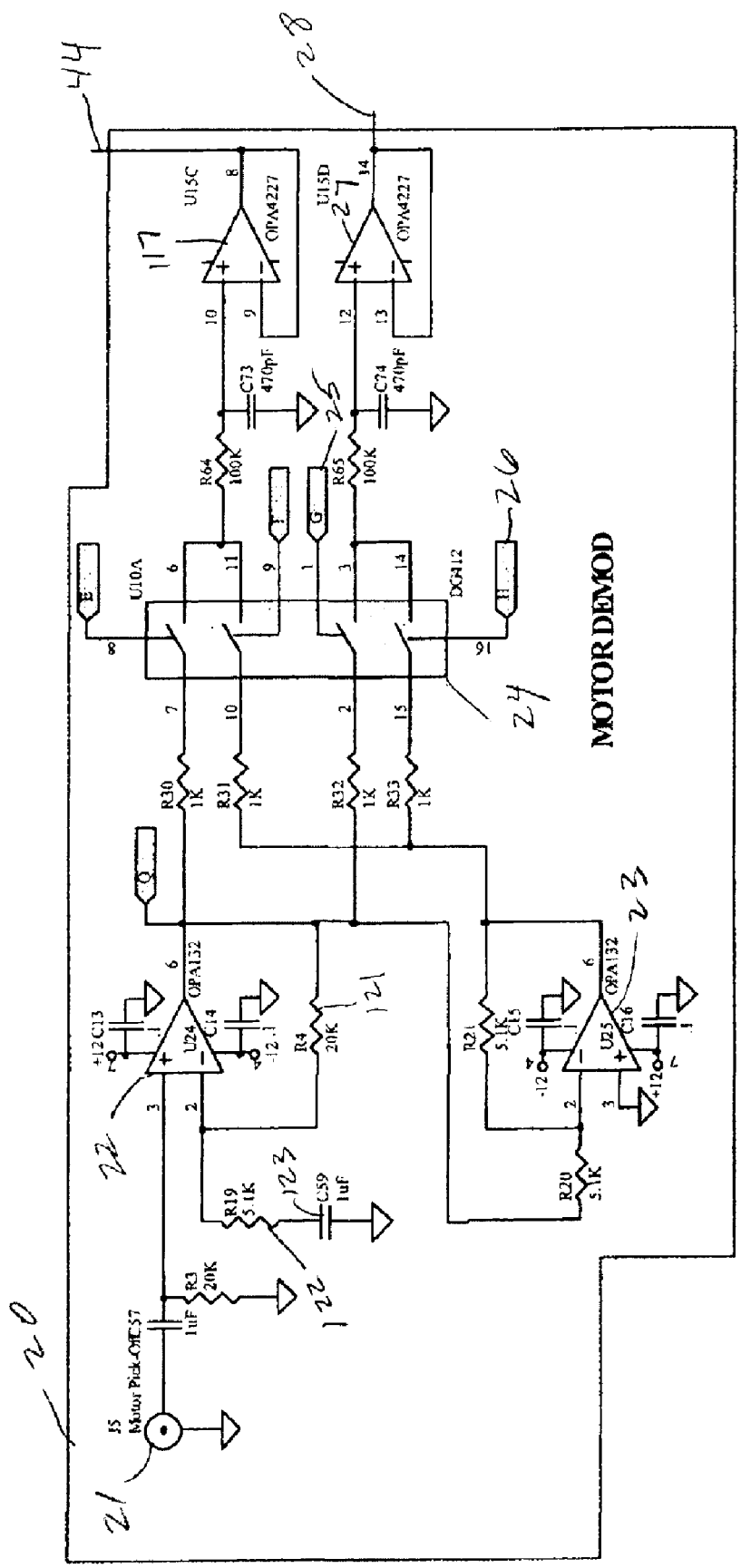
FIG. 2 is a schematic of a motor demodulator.
Figure 3:
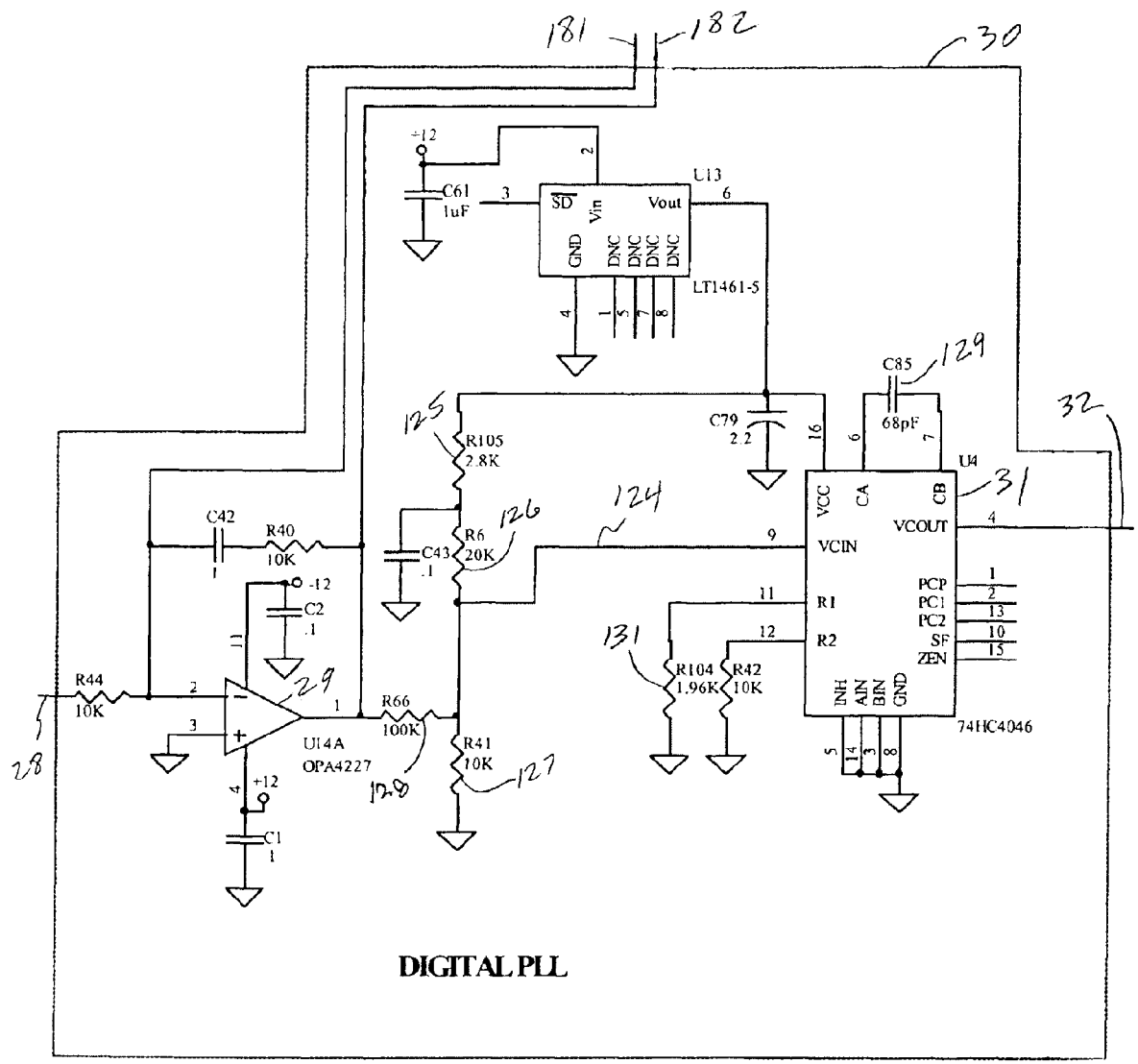
FIG. 3 is a schematic of a digital phase locked loop circuit.
Figure 4:
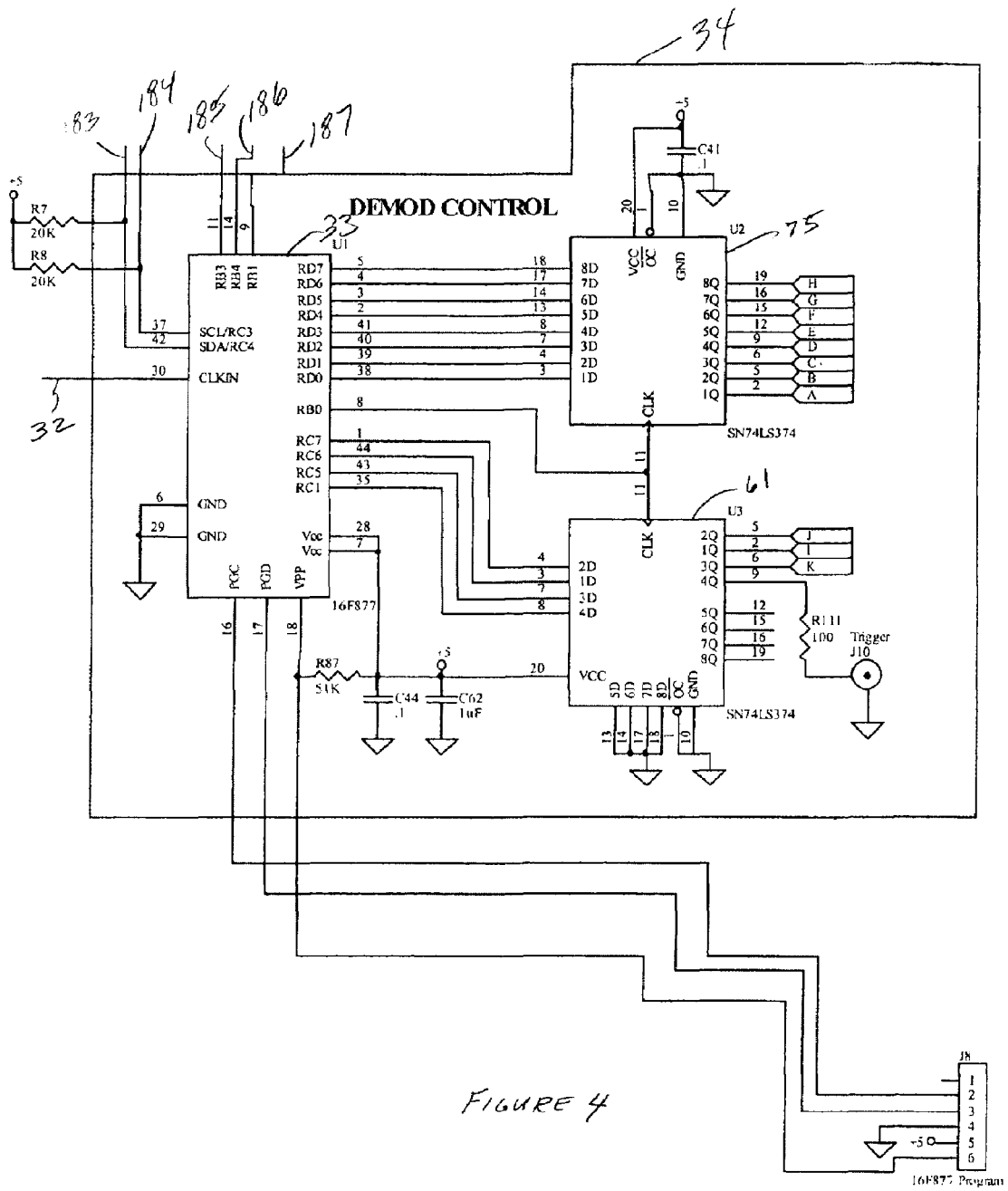
FIG. 4 is a schematic of a demodulator control circuit.

In FIG. 2, the motor pick-off signal may come in at an input 21 (J5) and be amplified by an amplifier 22 (U24) of a motor demodulator circuit 20 in FIG. 2. An amplifier 23 (U25) may provide an inverted version of this signal. This signal may go to a device 24 (U10) which acts as a synchronous demodulator, so the lower half of it is acting as the phase detector in a phase locked loop. Signals 25 (G) and 26 (H) may provide the quadrature switching signals for quadrature demodulation. An output of device 24 may go to an amplifier 27 (U15D). An output 28 may go an amplifier 29 (U14A) which acts as the loop filter in the phase locked loop. Amplifier 29 may be of a digital PLL circuit 30 in FIG. 3. Since amplifier 29 may be an integrator, it can be the kind of phase locked loop that has no steady state phase error even if the frequency of the motor is not the same as the free running frequency of the voltage controlled oscillator. The output of amplifier 29 (U14A) may be a voltage that influences the voltage controlled oscillator in device 31 (U4). Device 31 (U4) itself may be a phase locked loop, but all of that which is used may be its VCO, so it would not be acting as a phase locked loop. The output 32 of this VCO may control the clock frequency of device 33 (U1) of demodulator control circuit 34 in FIG. 4. Device 33 may generate all of the switching signals. Thus, there may be a complete set of switching signals at the motor drive frequency and at half of the motor drive frequency which are phase locked to the motor drive signal with zero phase error.

The upper half of device 24 (U10) may be again demodulating the signal from the motor pick-off, but this demodulation may be in phase so it can generate a DC signal that represents the amplitude of the motor drive signal. One may suppose that the computer sends data to device 35 (U21) (i.e., the controlling microcontroller) of a main control 36 in FIG. 5 and the microcontroller 35 sends data to the D/A converter 37 (U12) of AGC control 38 in FIG. 6, to make the output 39 of the D/A converter 37 be two volts. Amplifier 41 (U14D) may compare the currents though resistor 42 (R63) (from the D/A converter 37) and through resistor 43 (R94) (via line 44 from the in-phase demodulator of circuit 20). If the currents are not equal and opposite, the output of amplifier 41 (U14D) may change. This may also change the voltage at the output 46 of amplifier 45 (U17A), which will change the gain of the voltage controlled amplifier (VCA) 47 (U8) of circuit 48 in FIG. 7. The signal from the sine wave oscillator may therefore be adjusted by the VCA before going to the sine filter 49 and the motor drive output 51 in FIG. 8 via line 52, device 59 (U11A) of start/run select circuit 53, and amplifier 54. The AGC system 38 may thus insist on seeing a particular amplitude of the motor pick-off signal at input 21 of the motor demodulator circuit 20 and adjust the VCA 48 until this amplitude is achieved.

Figure 9:
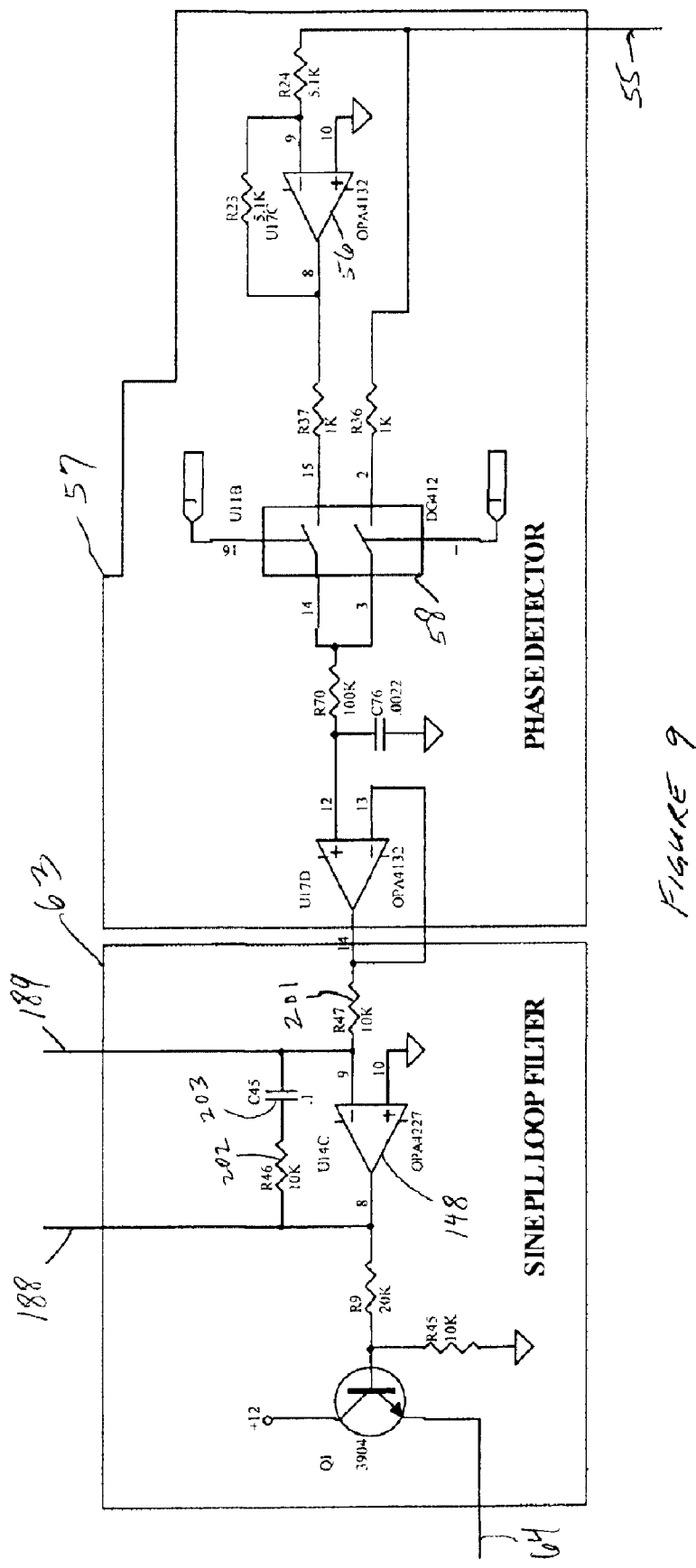
FIG. 9 is a schematic of a sine phase locked loop filter and a phase detector.
Figure 10:
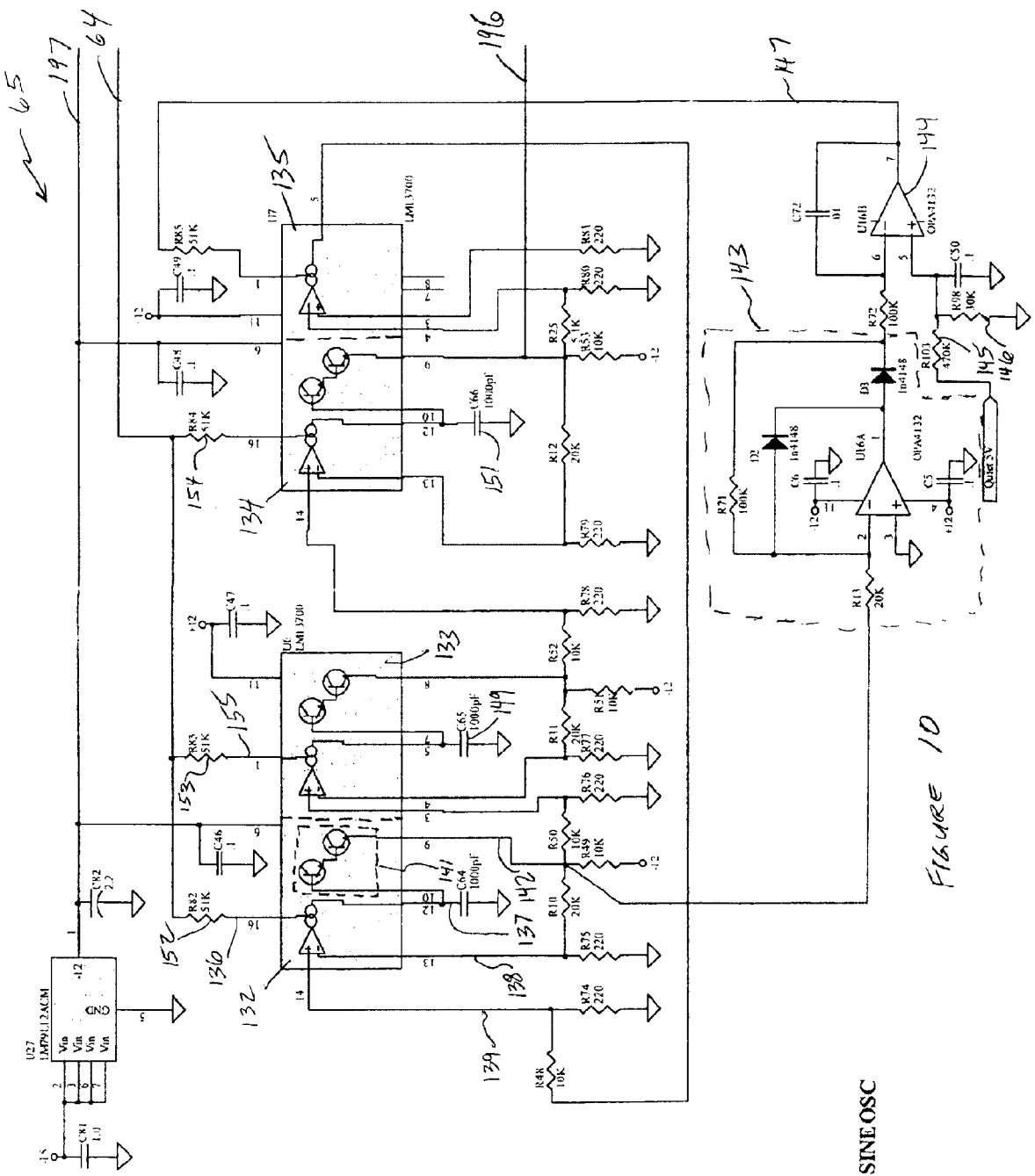
FIG. 10 is a schematic of a sine wave oscillator.

The motor drive signal at output 51 (J6) via line 55 may be inverted by an amplifier 56 (U17C) of phase detector 57 in FIG. 9 and device 58 (U11B) may act as another demodulator. Device 33 (U1) may provide switching signals I and J via device 61 (U3) that are at half of the motor drive frequency. This demodulator may act as the phase detector in the second phase locked loop. Amplifier 62 (U14C) of the sine PLL loop filter circuit 63 in FIG. 9, may be the loop filter for this phase locked loop and also have the kind that has zero steady state phase error. The output 64 of this loop filter may control the frequency of the sine wave oscillator 65. As was the case with the other PLL, the sine wave may lock in quadrature with the switching signals from the demodulator. Device 33 (U1) may take into consideration this quadrature relationship and generate switching signals that are phased in such a way as to provide a sine wave at half the motor frequency that bears the proper relationship to the signal from the motor pick-off at input 21.

Figure 11:
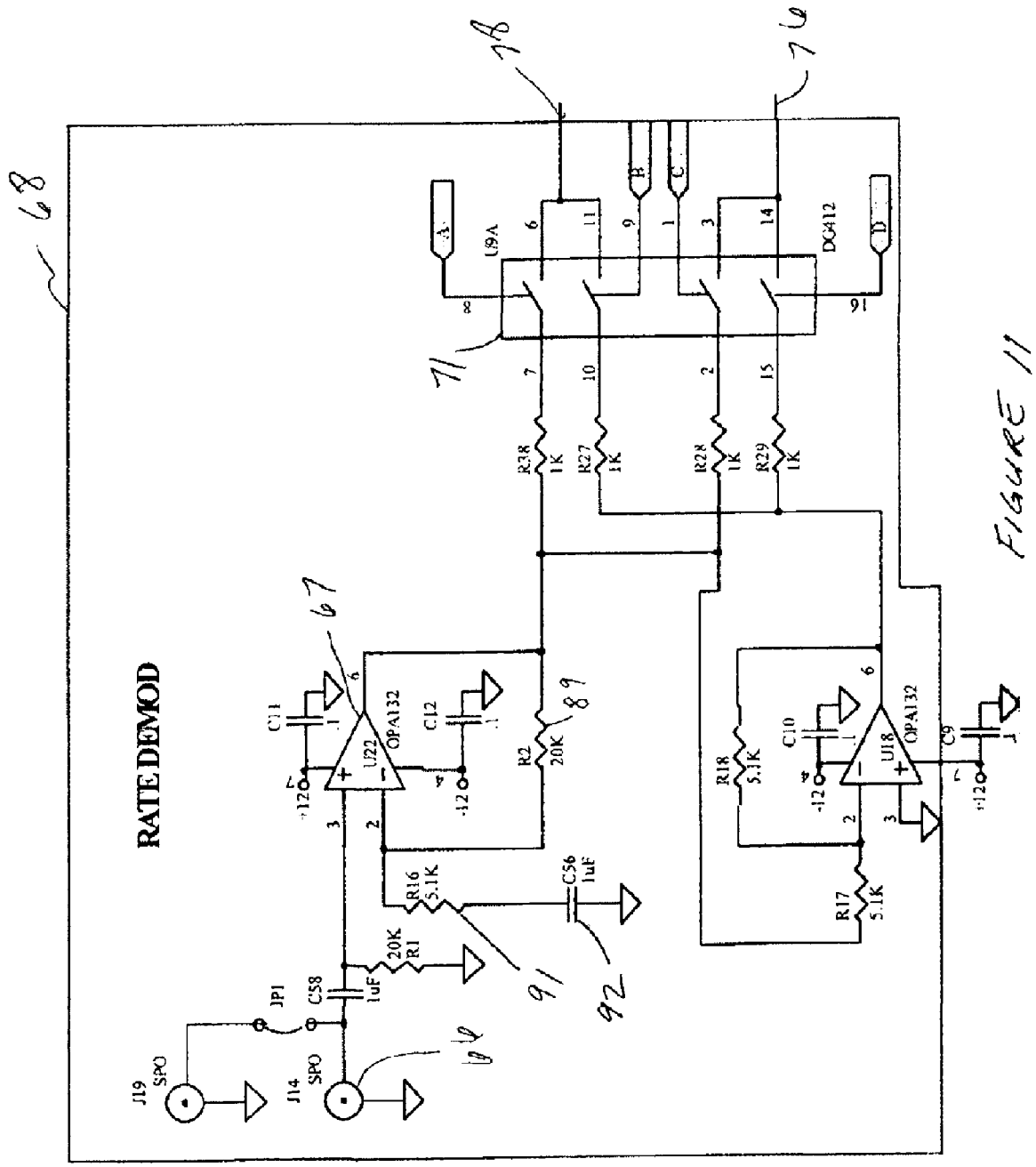
FIG. 11 is a schematic of a rate demodulator.
Figure 12:
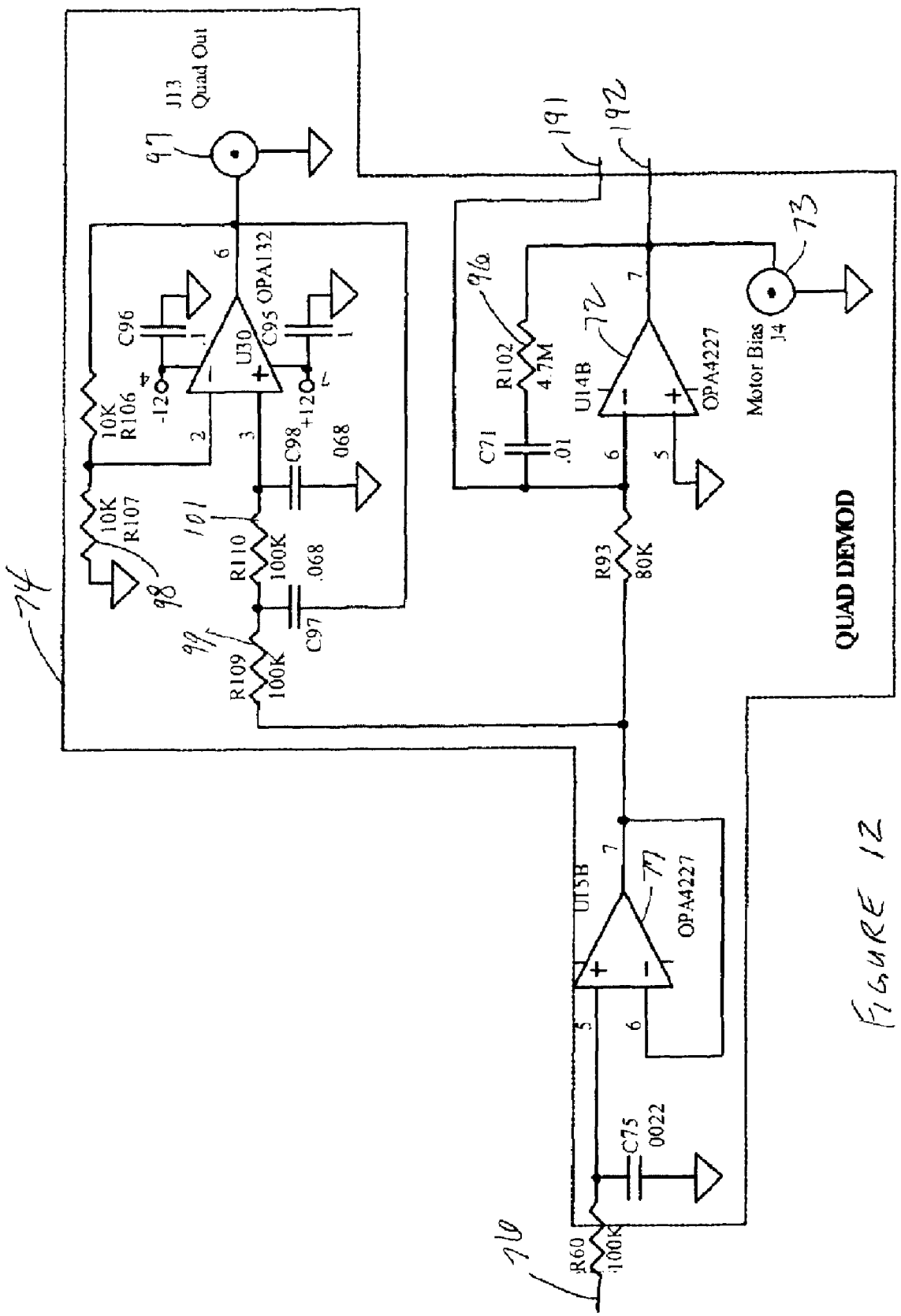
FIG. 12 is a schematic of a quadrature demodulator.

The rate signal may come in at input 66 (J14) and be amplified by amplifier 67 (U22) of the rate demodulator circuit 68 in FIG. 11. Amplifier 69 (U18) may provide an inverted version of this signal. Device 71 (U9A) may act as a synchronous demodulator for both the in-phase and quadrature demodulation, as was done for the motor pick-off signal of input 21. Signals C and D from device 75 (U2) may provide the quadrature switching signals for the quadrature demodulation and the demodulated signal on line 76 proceeds via amplifier 77 (U15B) through the integrator 72 (U14B) to provide the motor bias signal at output 73 (J4) of a quadrature demodulator (quad demod) 74 in FIG. 12. Signals A and B from device 75 (U2) may provide the in-phase switching signals for the rate demodulation and the demodulated signal on line 78 from device 71 (U9A) may proceed via amplifier 79 (U15A) through an amplifier 81 (U26) to provide the rate out signal at an output 82 (J3) of a rate filter circuit 83 in FIG. 13.

Figure 14:
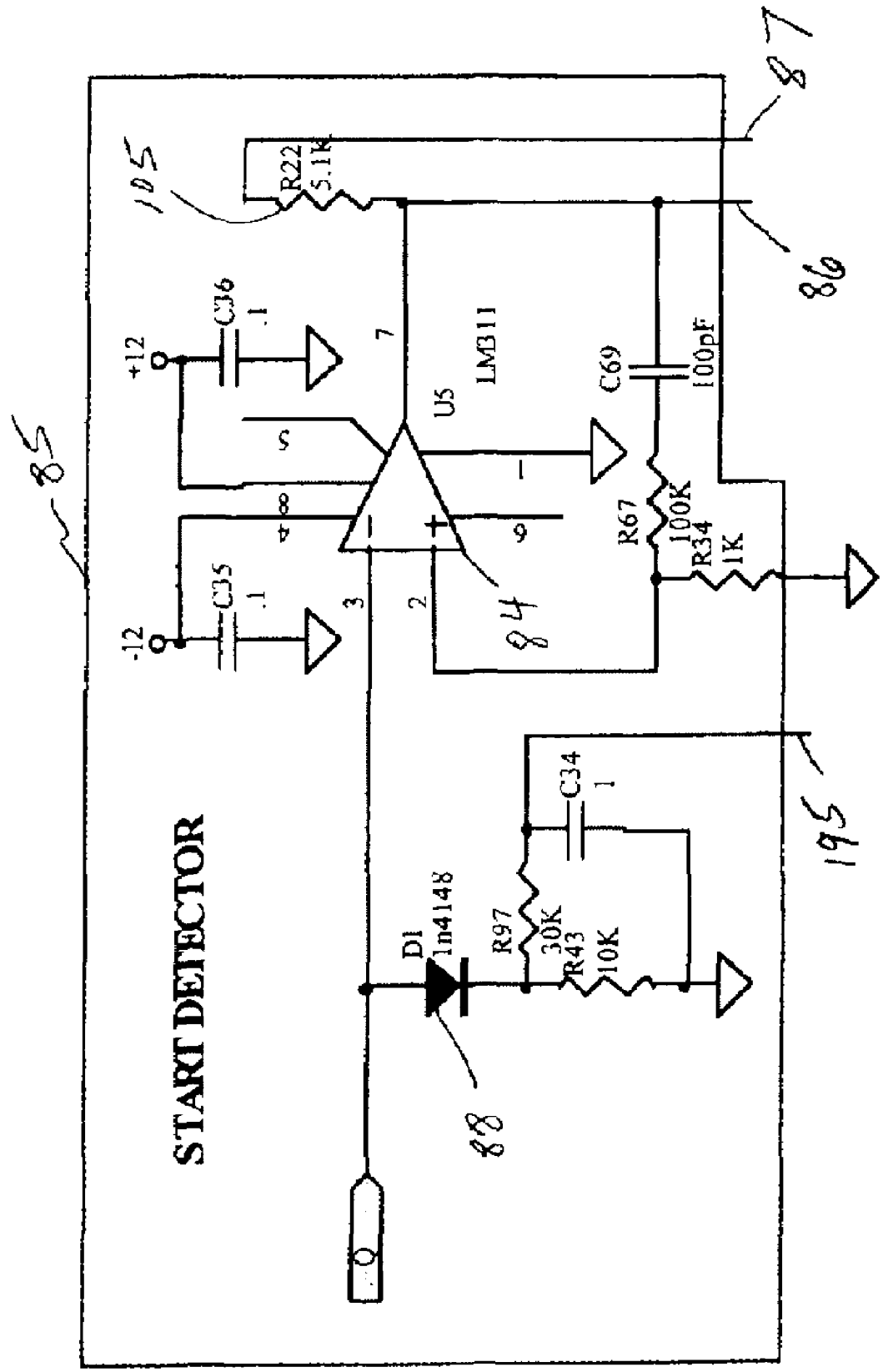
FIG. 14 is a schematic of a start detector.
Figure 15:
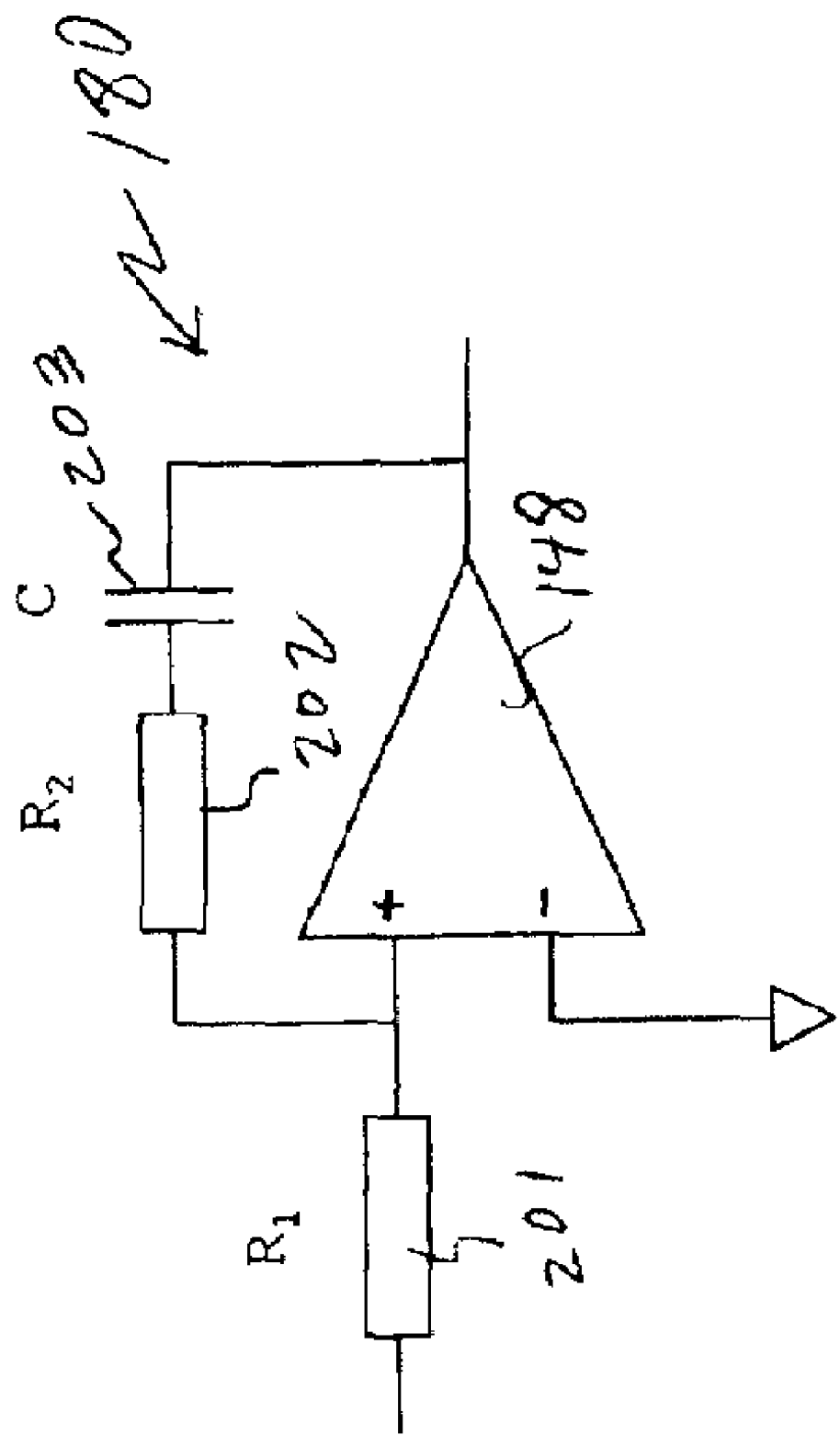
FIG. 15 is a schematic of a portion of the a sine phase locked loop filter of FIG. 9.

The amplified motor pick off signal from input 21 (J5) may leave the output of amplifier 22 (U24) and go as a Q signal to a comparator 84 (U5) of the start detector circuit 85 in FIG. 14. The comparator 84 (U5) may convert the signal into a square wave that goes to microcontroller 35 (U21) via lines 86 and 87 so the microcontroller can synchronize the pseudo square wave drive and then drive the signal up to an adequate amplitude. The network associated with diode 88 (D1) may provide a DC signal that is related to the amplitude of the motor pick off signal from amplifier 22 (U24). When the microcontroller 35 (U21) detects an adequate level, it may switch over to the sine wave drive.

The following is a description of the details of the various portions of the overall circuit for the gyroscope control electronics. As to the rate demodulation 68 in FIG. 11, the signal may be AC coupled to the non-inverting input of amplifier 67 (U22). The gain may be one plus, the ratio of resistor 89 (R2) and resistor 91 (R16) (i.e., 20 K-ohm÷5.1 K-ohm) because the impedance of a one microfarad capacitor 92 (C56) is very low compared to the impedance of resistor 91 (R16). Capacitor 92 (C56) is present for making the gain of the amplifier 67 (U22) equal to one at DC, so the output offset may depend primarily on the input offset voltage. If one uses sensors that have lower signal levels, one may want to increase the gain of this stage and switch to a decompensated operational amplifier if a very large gain is to be used.

Figure 13:
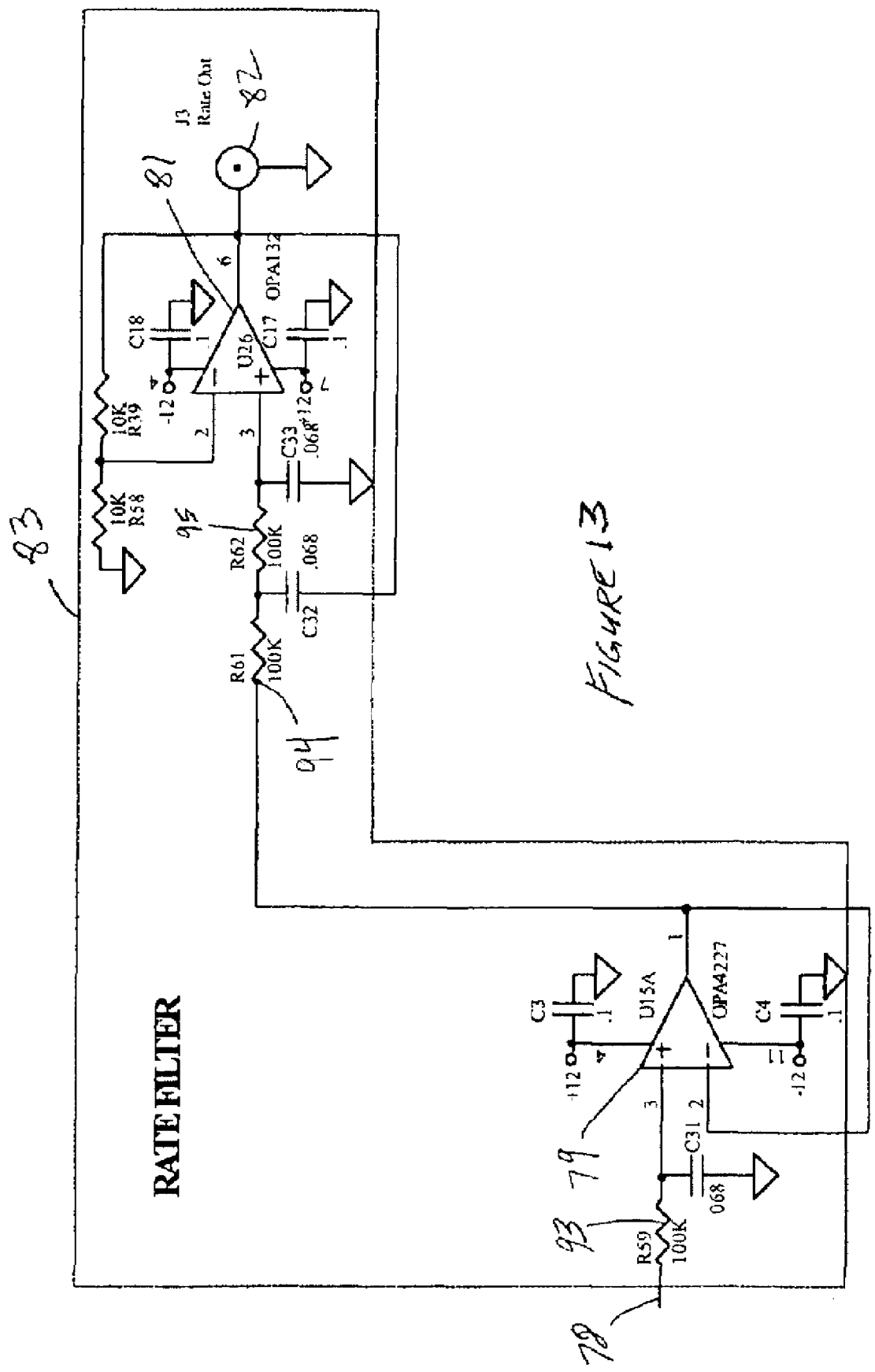
FIG. 13 is a schematic of a rate filter.

The rate filter 83 of FIG. 13 may be a third order Butterworth filter. The schematic shows the components for the original cut-off frequency of 23.5 Hz, but one may want a 250 Hz bandwidth. To increase the bandwidth to 235 Hz, the 100 K-ohm resistors 93 (R59), 94 (R61) and 95 (R62) may be replaced with 10 K-ohm resistors, respectively. Alternatively, the 10 K-ohm resistors may be installed on top of (i.e., in parallel with) the 100 K-ohm resistors 93, 94 and 95 to get a 258 Hz bandwidth.

The quadrature demodulator 74 may be an integrator that adjusts the motor bias at output 73 until the demodulated quadrature signal from the rate channel has no DC component. The components around the integrator may be chosen for a rapid and appropriately damped response. Although the overall effect appears good, an undesired amount of AC signal may be noticed on the motor bias signal, so one might put a capacitor across the 4.7 M-ohm resistor 96 (R102). A value between 470 and 1000 picofarads should be good. The demodulated signal may also go through a three pole low pass filter and to a quadrature output 97 (J13) for a purpose that is best known to others because it is at ground when the quadrature null loop is active and is therefore uninteresting. The first pole 77 (U15B) may be at a higher frequency (723 Hz) to avoid adding phase shift that could destabilize the quad null loop. This could make the filter act like a two pole filter because the first pole does not do much. Because of this, the second order section might not be set up correctly because it has a gain peak that can be eliminated by increasing the value of resistor 98 (R107) from 10 K-ohms to 17.4 K-ohms. One hundred K-ohm resistors 99 (R109) and 101 (R110) may be replaced with 9.5 K-ohm resistors to give a 248 Hz bandwidth, but using 10 K-ohm resistors would give 235 Hz, and putting the 10 K-ohm resistors on top of (i.e., in parallel with) the 100 K-ohm resistors 99 and 101 may give 258 Hz as in the case with the rate filter 83.

The start detector circuit 85 may make a square wave out of the motor pick off signal (a Q signal from amplifier 22) and feed the square wave via lines 86 and 87 to device 35 of the main control circuit 36 so it can phase lock the pseudo square wave drive to the signal from the motor pick off. The comparator 84 may have AC hysteresis to prevent oscillation without causing the phase shift that would occur when using DC hysteresis (by eliminating the 100 picofarad capacitor 102 (C69)). The network including diode 88 (D1) may be used to create a DC signal that represents the amplitude of the motor pick off signal Q. Although the motor amplitude out at jack 103 (J12) of AGC control circuit 38 may do the same thing, the diode network should work when all the loops are unlocked in the start mode.

Figure 5:
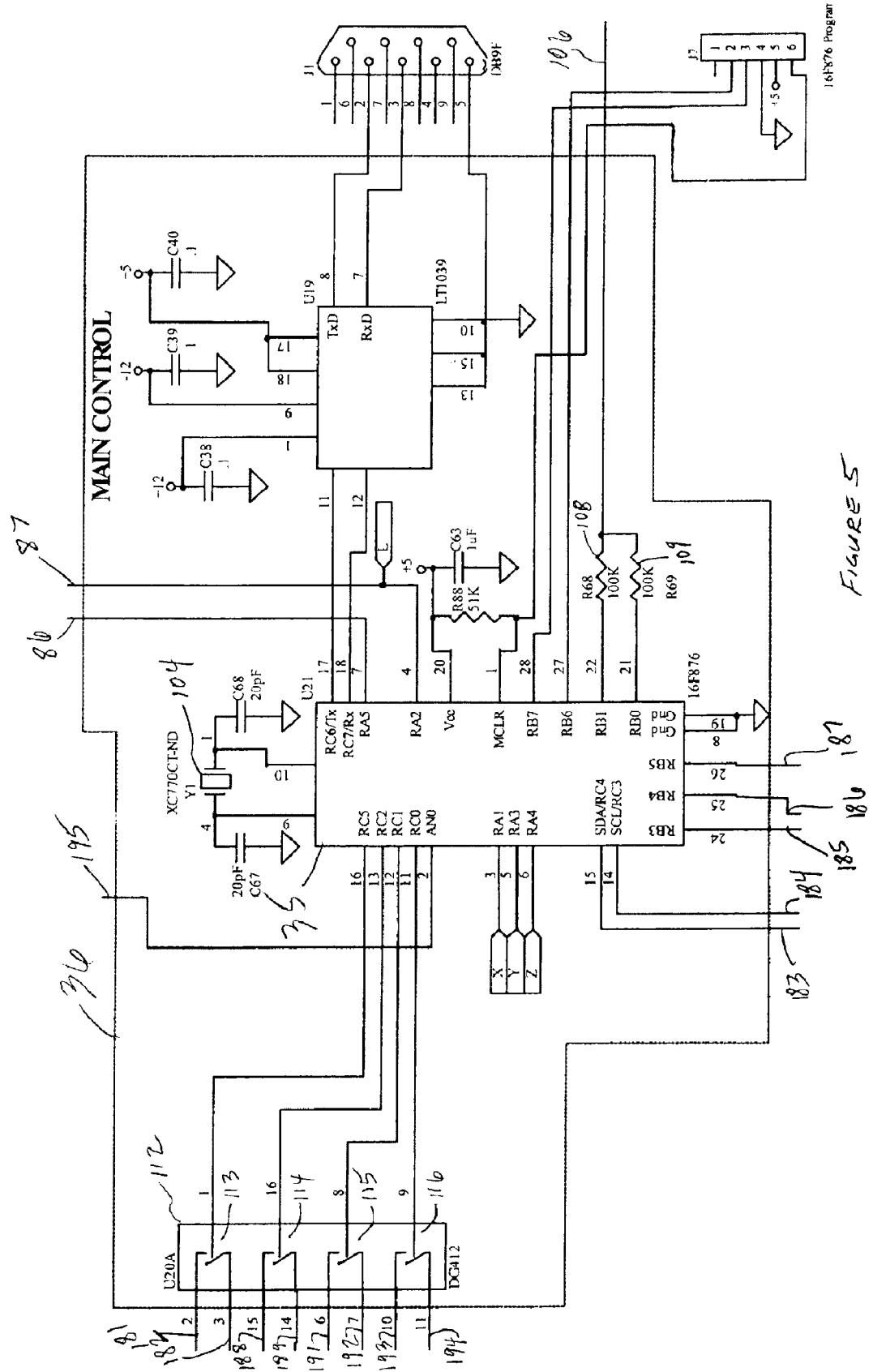
FIG. 5 is a schematic of a main control circuit.
Figure 6:
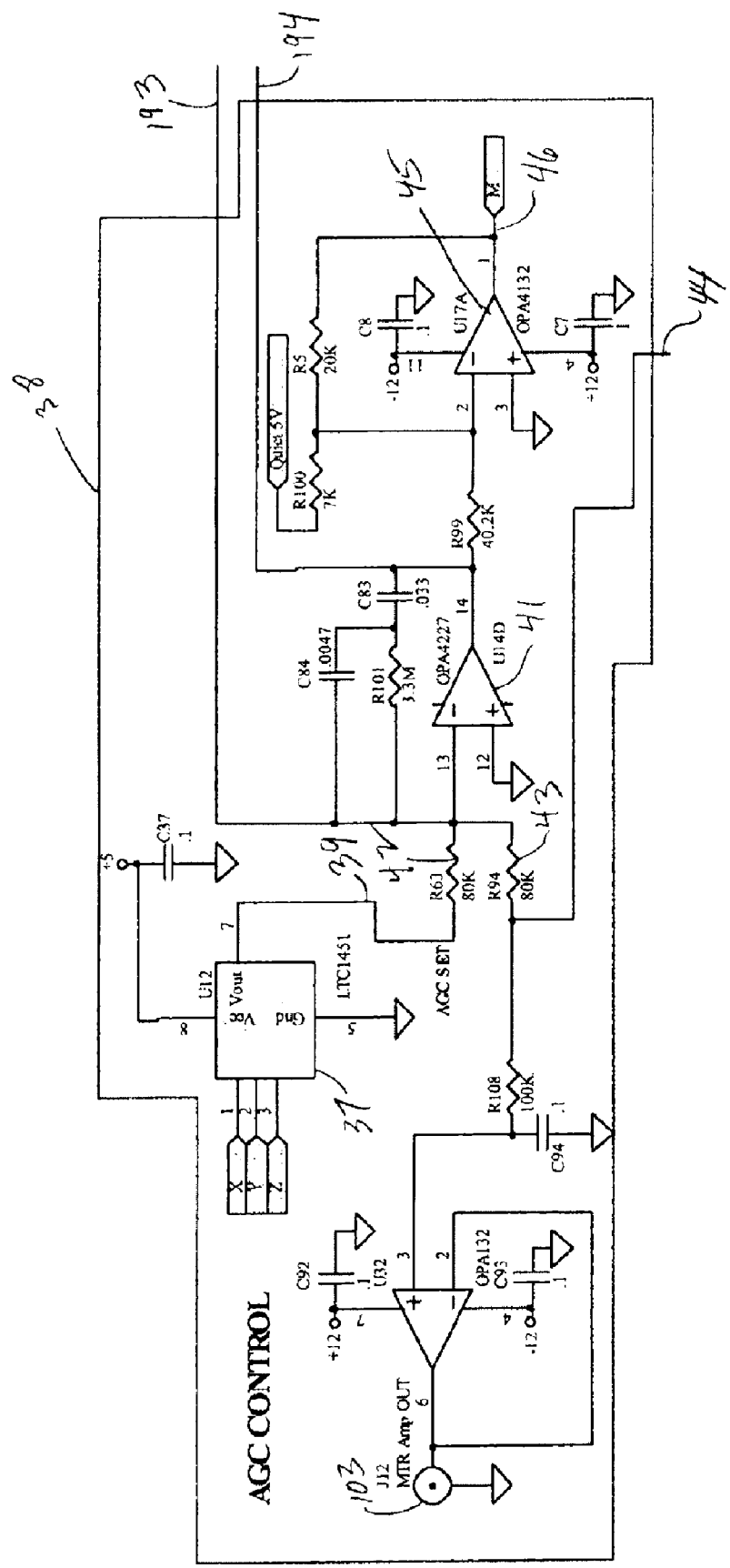
FIG. 6 is a schematic of an automatic gain control circuit.
Figure 7:
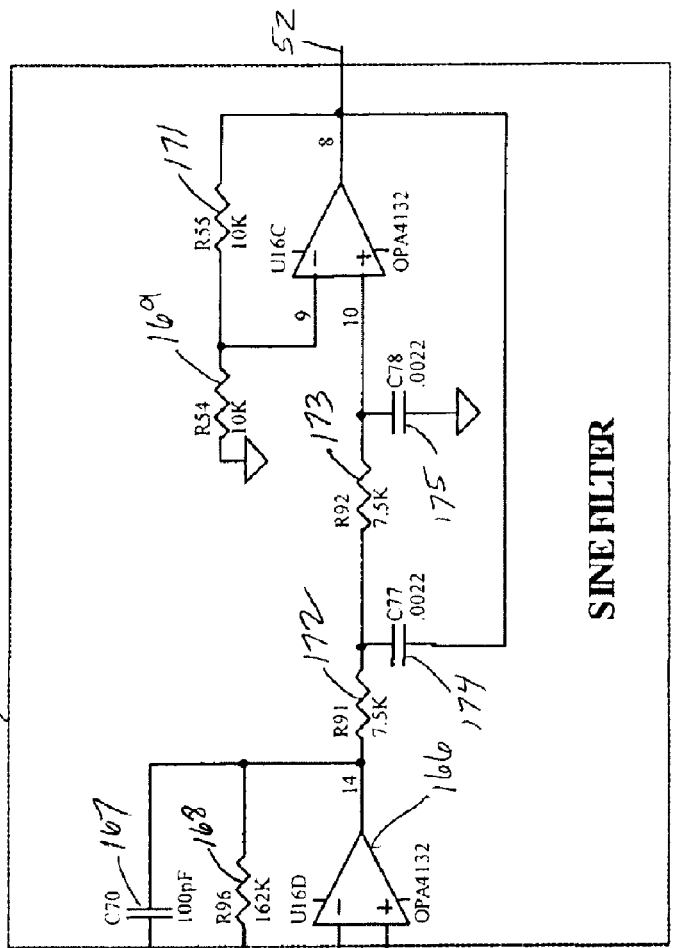
FIG. 7 is a schematic of a voltage controlled amplifier and a sine filter.
Figure 7:
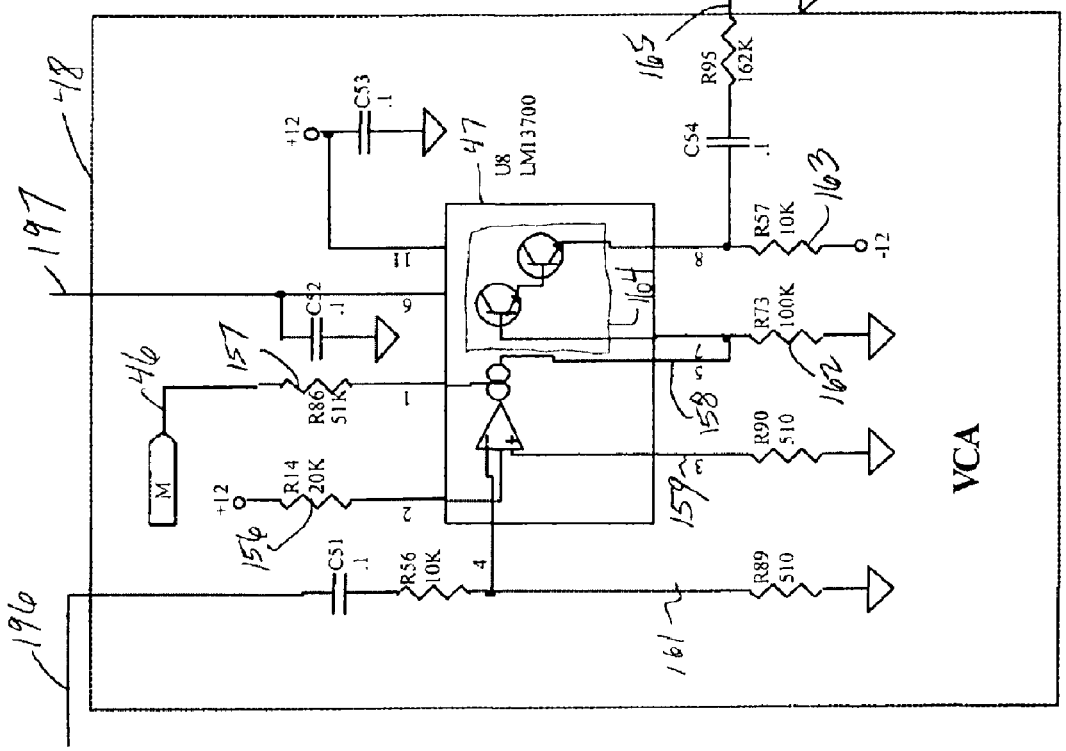
Figure 8:
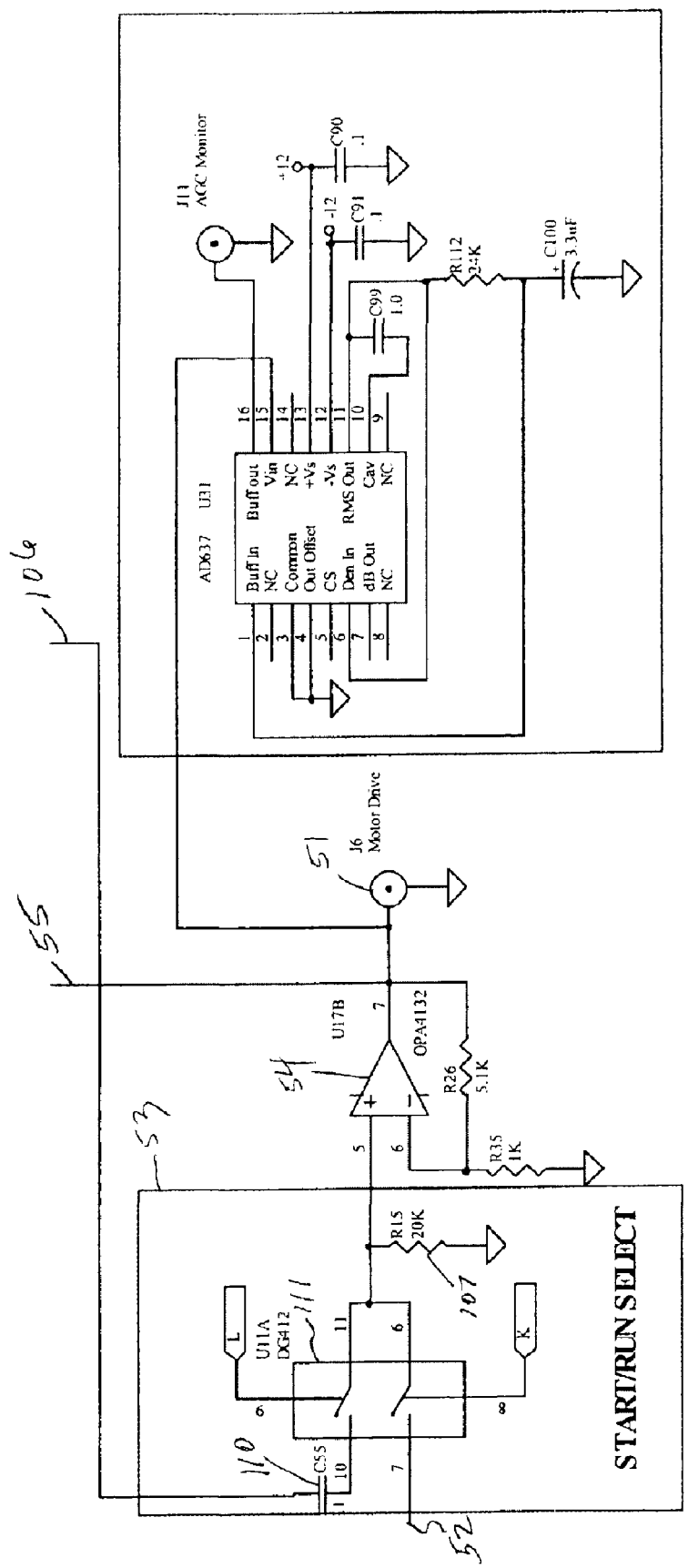
FIG. 8 is a schematic of a start/run select circuit and associated circuitry.

The main control circuit 36 in FIG. 5 may have a 16F876A microcontroller 35 (U21) that runs on an 18.432 MHz crystal 104. That frequency may be chosen to keep harmonics of this frequency away from harmonics of 4 MHz, which is the frequency that the other microcontroller runs at when using a 10 KHz sensor. There may be several signals going from the main control 36 to the demod control 34. The start/run control may tell the demod control 34 how it should be dealing with the part of the start/run select 53 that it has control over; the left/right control may tell the demod control which polarity to use on some of the demodulators to accommodate either the left or right pink off signals; and the cycle mode line may tell the demod control whether or not to use the cycle skipping method. The main control 36 may also controls part of the start/run select 53. In the start mode, the output (L) of RA2 of microcontroller 35 may connect the pseudo square wave drive to the motor drive amplifier (U17B) and this same signal may provide +5 Volts to pull-up 5.1 K-ohm resistor 105 (R22). This may be done to reduce noise on the circuit board by having the output of comparator 84 (U5) active only when the circuit is in the start mode. Outputs RB0 and RB1 of microcontroller 35 may be used to create the pseudo square wave drive by having the outputs be either both low, different, or both high. Outputs RB0 and RB1 may be connected via 100 K-ohm resistors 108 (R68) and 109 (R69), respectively, to line 106, which goes to amplifier 54 via a 0.1 microfarad capacitor 110 (C55) and device 111 (U11A) of the start/run select circuit 53. This may give a three level waveform that is attenuated by a 20 K-ohm resistor 107 (R15) (by U17B) so that it is not too big when it is amplified by amplifier 54 (U17B). The frequency of the pseudo square wave drive may be determined by the contents of one of the EEPROM registers on the microcontroller 35. The frequency may be 4,608, 000/[4*(Number+22)], but there is not necessarily a need to know this because the software figures things out when one uses the option to change the frequency. The main control 36 may determine whether the four switches of device 112 (U20A) are opened or closed and this may decide whether the loops of digital PLL 30 of switch 113, sine PLL loop filter 63 of switch 114, quad demod 74 of switch 115, and AGC control 38 of switch 116 are active or idle.

The demod control 34 may take the frequency from the voltage controlled oscillator along line 32 from device 31 and generate the control signals for the demodulators both at the motor pick off (21) frequency and at the motor drive (51) frequency. There may be three signals coming from the main control 36. The start/run control may tell the demod control how it should be dealing with the part of the start/run select that it has control over; the left/right control may tell the demod control which polarity to use on some of the demodulators to accommodate either the left or right pink off signals; and the cycle mode line may tell the demod control whether or not to use the cycle skipping method. Provisions may be made for communication between microcontrollers using the I2C bus. One possible use would be to set the division ratio between the clock and the control signals. Even if one uses this feature, one might just use the pins as two digital lines to pick one of four division ratios and not use the I2C approach.

As to the AGC control 38, the in-phase demodulation of the motor pick off (21) signal may provide a DC voltage at the output 44 of amplifier 117 (U15C) that represents the amplitude of the motor drive signal. This signal may be further filtered and sent out to output 103 (J12) (MTR Amp OUT). The signal may also put a current through resistor 43 (R94) which amplifier 41 (U14D) compares to the current that comes through resistor 42 (R63) along line 39 from the DAC 37. The integrator 41 (U14D) output may go to wherever it has to in order to get the perceived amplitude equal to the desired amplitude, which may be set by the computer. When the main control 36 closes the switch 116 across the integrator 41, its output may about zero volts, so the output of amplifier 45 (U17A) may be determined by a resistor 118 (R100) and a resistor 119 (R5). The values may be chosen to make the gain of the VCA 48 appropriate via signal M when the AGC is not active. This is the kind of thing that might change for a different sensor. If, for example, the gain overdrives the sensor, it may be difficult for the loops to lock and to get things working.

Relative to motor demod 20, the signal from the motor pickoff input 21 may be AC coupled to the non-inverting input of amplifier 22 (U24). The gain may be one plus, the ratio of a 20 K-ohm resistor 121 (R4) and a 5.1 K-ohm resistor 122 (R19) (i.e., R4/R19) because the impedance of a 1.0 microfarad capacitor 123 (C59) is very low compared to the impedance of resistor 122 (R19). Capacitor 123 (C59) may be present to make the gain of the amplifier equal to one at DC, so the output offset can depend primarily on the input offset voltage. If one uses sensors that have lower signal levels, one may want to increase the gain of this stage and switch to a decompensated operational amplifier for a very large gain.

As to the digital PLL 30, the amplifier 29 (U14A) may be the loop filter for the digital PLL. When the switch 113 of device 112 (DG412) is closed across the loop filter, the output may be at ground. The voltage along line 124 to the input of the voltage controlled oscillator 31 (U4 pin 9) may then be determined by the attenuator formed by the series combination of a 2.8 K-ohm resistor 125 (R105) and 20 K-ohm resistor 126 (R6) on top and the parallel combination of a 10 K-ohm resistor 127 (R41) and a 100 K-ohm resistor 128 (R66) on the bottom. The code in the demod control 34 may be written so that the device 31 VCO frequency will be around 4 MHz when the motor pick off frequency is around 10 KHz. A provision may be to change the code in the demod control if the sensor frequency changes significantly. Since this may be an inconvenience, it could be more likely that one just changes the value of the 85 picofarad capacitor 129 (C85) to make major changes in frequency and the value of resistor 127 (R41) to make minor tweaks. The 74HC4046A chip may have different characteristics than those of the 74HC4046 chip of device 31. The A version is faster, so one may want to simply speed it up to accommodate higher frequency sensors. Another option may be to change the frequency by changing the value of the 1.96 resistor 131 (R104). This might be more convenient than working around with the voltage divider network at the input because it may be good to keep the voltage at the input near the center of the voltage range (i.e., 2.5 volts).

The sine wave oscillator 65 may be a three stage phase shift oscillator. There may be three phase shift stages 132, 133 and 134, each of which each provide 60 degrees of phase shift, respectively, and an inverter 135 that provides 180 degrees of phase shift, making the total around the loop 360 degrees as needed. Stages 132, 133, 134, and 135 may utilize LM13700 chips. The transconductance amplifiers may act like current controlled resistors. In the first stage 132, the current into line 136 (pin 16) may control the gain of current out of line 137 (pin 12) relative to a differential voltage across line 138 (pin 13) and line 139 (pin 14). A 1000 picofarad capacitor 176 (C64) may work with the current controlled resistor to form the RC lowpass section that has 60 degrees of phase shift. The Darlington transistor pair 141 may buffer the signal so the stages do not load each other. The signal from the first stage 132 may go from line 142 to a rectifier 143, and the integrator 144 (U16B) may compare the average DC output of the rectifier 143 to the reference voltage of about 0.3 volt which a 470 K-ohm resistor 145 (R103) and a 30 K-ohm resistor 146 (R98) provide, and then integrate the error voltage. The output of the integrator 144 may control the gain via line 147 in the inverting stage 135 of the phase shift oscillator so the amplitude of the sine wave is controlled to a fairly low level to minimize distortion. The sine wave oscillator 65 may be set up to oscillate at the motor drive frequency when the PLL circuit 63 is in its unlocked state, which is when the output of amplifier 148 (U14C) is grounded because the switch 114 across the integrator is closed. The frequency of the oscillator 65 may be adjusted by changing the values of 1000 picofarads of capacitor 137 (C64), capacitor 149 (C65), and capacitor 151 (C66) (but keeping them the equal) or by changing the values of 51 K-ohms of resistor 152 (R82), resistor 153 (R83), and resistor 154 (R84) (but keeping them the equal). The maximum rating for the current into line 136 (pin 16) or line 155 (pin 1) is about 2 mA. These parts may be very fragile and 2 mA could ruin them. One should not put even 1 mA through them. Using 51 K for resistor 152 (R82), the maximum current that the power supply could put into line 136 (pin 16) is about one-half of a milliampere, which appears reasonable. To double the frequency, one may cut the values of the capacitors in half. The frequency of the oscillator 65 (at idle) should be close to the motor frequency so that the phase locked loop locks quickly and reliably.

The VCA 48 may use an LM13700 transconductance amplifier for device 47. A 20 K-ohm 156 resistor (R14) may bias the linearizing diode to reduce distortion. The current through a 51 K-ohm resistor 157 (R86) may control the ratio of the current out of line 158 (pin 5) relative to the differential voltage between line 159 (pin 3) and line 161 (pin 4). A 100 K-ohm resistor 162 (R73) may convert the current to a voltage and this signal may be buffered by the transistors 164, which have collectors connected to V+ and emitters that are biased using a 10 K-ohm resistor 163 (R57) to −12 volts.

The output 165 of VCA 48 may go to a sine filter 49. The sine filter 49 may reduce the distortion of the sine wave. An operational amplifier 166 (U16D) was used to provide a necessary signal inversion and a 100 picofarad capacitor 167 was placed across the 162 K-ohm feedback resistor 168 (R96) to get the first pole of the filter. Resistors 169 (R54) and 171 (R55) have the same value of 10 K-ohms and this ratio would not change if the frequency were changed to accommodate a different sensor. The 7.5 K-ohm resistor 172 (R91) approximately equals resistor 173 (R92) and the 0.0022 microfarad capacitor 174 (C77) approximately equals capacitor 175 (C78). In view of the component values, the filter may be set up for a 10 KHz bandwidth, which could be adjusted because the 10 KHz sensor has a 5 KHz drive frequency. One may change some component values or figure that one might not achieve 80 dB suppression of the second harmonic and make the cycle skipping option the baseline design. Achieving a second harmonic suppression of 80 dB (as requested in the specifications) may be difficult. Even if the sine wave oscillator 65 and the sine filter 49 can achieve this when the oscillator is free running, the spectral purity might not be maintainable once the sine wave phase locked loop is locked. This is because the output of the loop filter may affect the waveform by trying to influence the frequency within the cycle. If one tries to filter out every trace of AC signal at the input to the voltage controlled oscillator, one could lose control over the phase locked loop and it might not lock well. This is what motivated the inclusion of the cycle skipping option. Once that option is activated, the distortion may be irrelevant because the sine wave drive would not be present when the rate signal is being demodulated.

Relative to the start/run select circuit 53, the signal labeled L comes from the main control 36 because it does not appear to be synchronized with anything. The signal labeled K may come from the latches of device 61 that are fed from the demod control 34. If the continuous mode were used exclusively, signal K would not have to come from these latches because it would just be a steady signal indicating that one is in the run mode. Signal K may come from the latches, however, because it is used in synchronization with the drive signal when the cycle skipping mode is used to blank the drive signal when the rate signal is being demodulated. The "on" resistance of the switches may be a function of the signal level, and this resistance can work with the resistor 107 (R15) to act as a voltage divider. The output may be very close to the input because the switch resistance is low compared to the 20 K-ohm value of resistor 107 (R15), but the fact that the switch resistance is a function of the signal level may provide a mechanism for producing distortion even if the sine wave feeding the start/run select circuit happens to be perfect. This may be another incentive for using the cycle skipping mode and not be concerned about the distortion.

The phase detector 57 may be the same kind of demodulator that is used in the motor demod 20 and rate demod 68 circuits. A reason why this may done this way is that there could be delays between the control signals and the response (opening or closing) of the switches. In the digital PLL circuit 30, the loop filter may see to it that no DC voltage comes from the demodulator in the digital PLL. In order to do this, the clock to the microcontroller may be locked in frequency to the motor pick off signal at input 21 and also be automatically advanced in phase in order to compensate for the delay in the switches. Since one might be using the same switches and the same demodulators in both PLLs, the timing of the switching signals may take into consideration the delay in the switches in the sine wave PLL, so that the sine wave ends up being in the proper registration compared to the motor pick off signal. The timing errors would be associated with the differences in delays of the switches rather than the absolute delays, as would be the case if completely different kinds of phase detectors were used in the two different phase locked loops.

Relative to sine PLL loop filter 63 of FIG. 9, phase locked loops actually should be designed; one cannot just generally adjust the control loop and get it to work appropriately. However, the essentials appear apparent along with a schematic 180 in FIG. 15 incorporating a differential amplifier 148, a resister 201 ($R_1$), resistor 202 (R2) and capacitor 203 (C). An input may go through the resistor 201 to a non-inverting input of amplifier 200. The inverting input of the amplifier may be connected to a ground or a reference terminal. There may be a feedback loop incorporating the capacitor 203 and the resistor 202 connected in series from an output of the amplifier to the non-inverting input of the amplifier. $K_\phi$ may be the phase detector conversion gain in volts per radian. $K_0$ may be the VCO conversion gain in radians per second per volt. Equations "$\omega_n = ((K_0 \cdot \phi)/(R_1 \cdot C))^{1/2}$" and "$R_2 = 2/(C \cdot \omega_n)$" may be used. $K_\phi$ and $K_0$ may be measured and reasonable values for $R_1$ and $\omega_n$ be chosen. C and $R_2$ may be calculated using the first equation and the second equation, respectively. This approach assumes a damping factor of one. The damping may be calculated by equation "$\zeta = (R_2 \cdot (C/2)) \cdot \omega_n$". If $R_2$ is too low, the loop may be under damped and not stable. If $R_2$ is too high, an unnecessarily large AC signal may be fed to the sinusoidal voltage controlled oscillator, causing distortion.

The initial layout and component values may be based on a breadboard approach. Universal tweaks may be implemented as a result from moving from the breadboard to a regular board approach. These changes should be made to all the boards regardless of operating frequency. These may be mostly minor adjustments to switch from how things were done on the breadboard to how things are done subsequent to the breadboard phase.

The changes may include: changing resistor 118 (R100) to 14 K-ohms; putting a 20 K-ohm pull-up resistor between +5 volts and the Z signal terminal of DAC 37 (U12, pin 3);

changing the value of resistor 127 (R41) (in the digital PLL 30) to 20 K-ohms; changing resistors 93 (R59), 94 (R61) and 96 (R62) to a value of 9.5 K-ohms to obtain a 248 Hz bandwidth; changing resistor 98 (R107) to a value of 17.4 K-ohms; changing resistors 99 (R109) and 101 (R110) to a value of 9.5 K-ohms to obtain a 248 Hz bandwidth; and putting a 470 picofarad capacitor across resistor 96 (R102).

The next set of tweaks may be frequency specific. On the first board, the values of capacitors 137 (C64), 149 (C65) and 151 (C66) may be changed to 2200 picofarads to get the sine wave oscillator 65 to idle near 5 KHz. The idle frequency should be reasonably near the operating frequency to get the loop to lock. To make the frequency higher, one may make the capacitors smaller in value. For fine tuning, the values of resistors 152 (R82), 153 (R83) and 154 (R84) may be changed in unison but should not be made smaller than the original 51 K-ohms. The idle frequency of the 74HC4046A chip of device 31 (U4) may be adjusted by changing the value of capacitor 129 (C85). The frequency may be fine tuned by changing the value of resistor 131 (R104). The frequency of the sine filter 49 may be adjusted by changing the value of resistors 168 (R96), 172 (R91) and 173 (R92) by the same factor. The original values were generally set up for 10 KHz.

Figure 16:
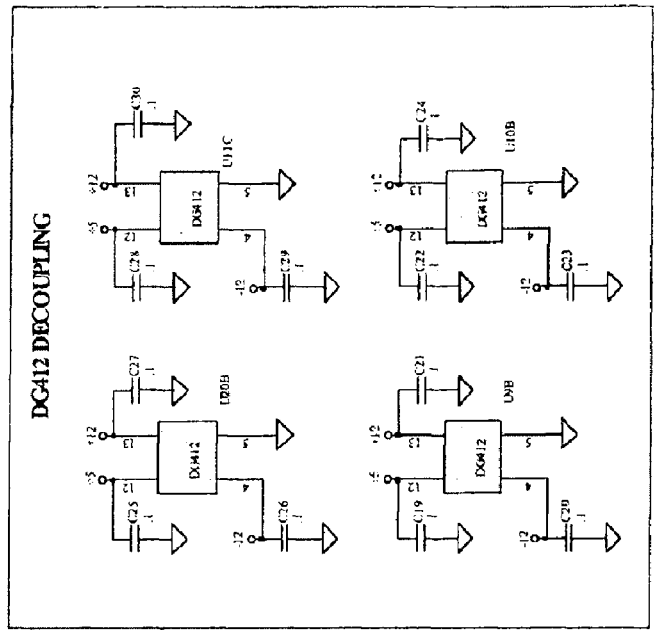
FIG. 16 is a schematic of power supply and decoupling circuitry.
Figure 16:
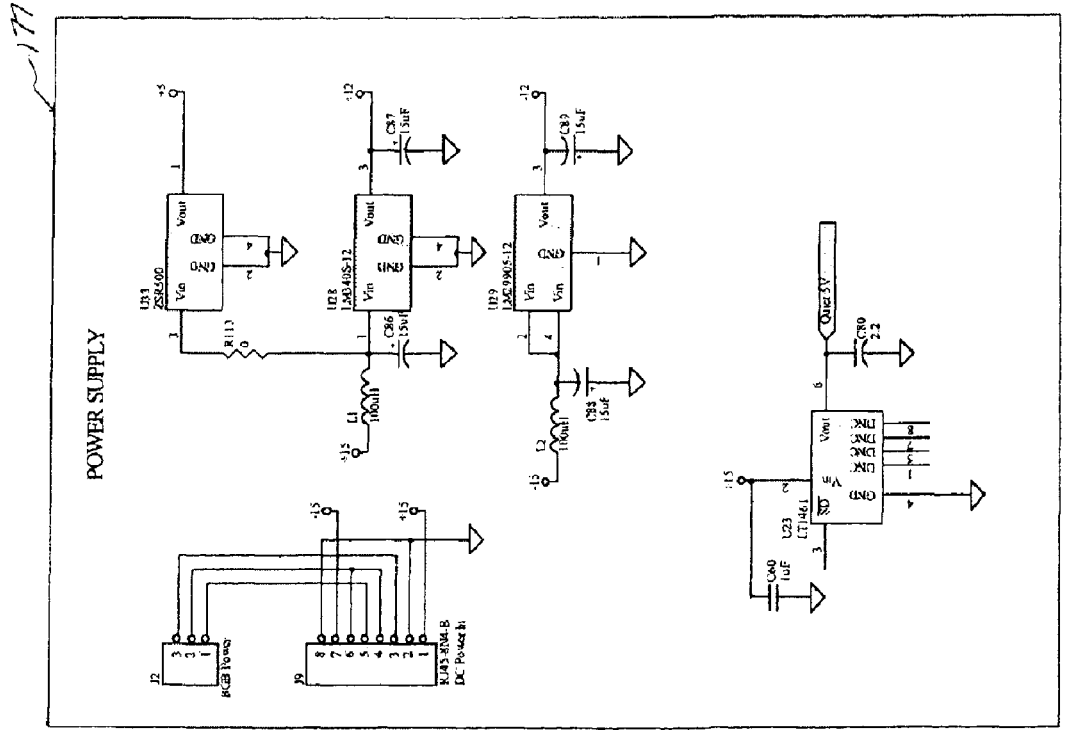

FIG. 16 shows a power supply 177 with circuitry for providing the various voltages for the circuit of the invention. Circuitry 178 may provide decoupling that may be used for device 112 (U20A) (DG412).

In the circuits of FIGS. 2-14, there may be various interconnections shown by signals labeled with letters A, B, C, D, E, F, G, H, I, J, K, L, M, Q, X, Y and Z, and interconnecting lines labeled with numbers 28, 32, 44, 52, 55, 64, 76, 78, 86, 87, 106, 181, 182, 183, 184, 185, 186, 187, 188, 189, 191, 192, 193, 194, 195, 196 and 197 in the Figures.

Figure 17:
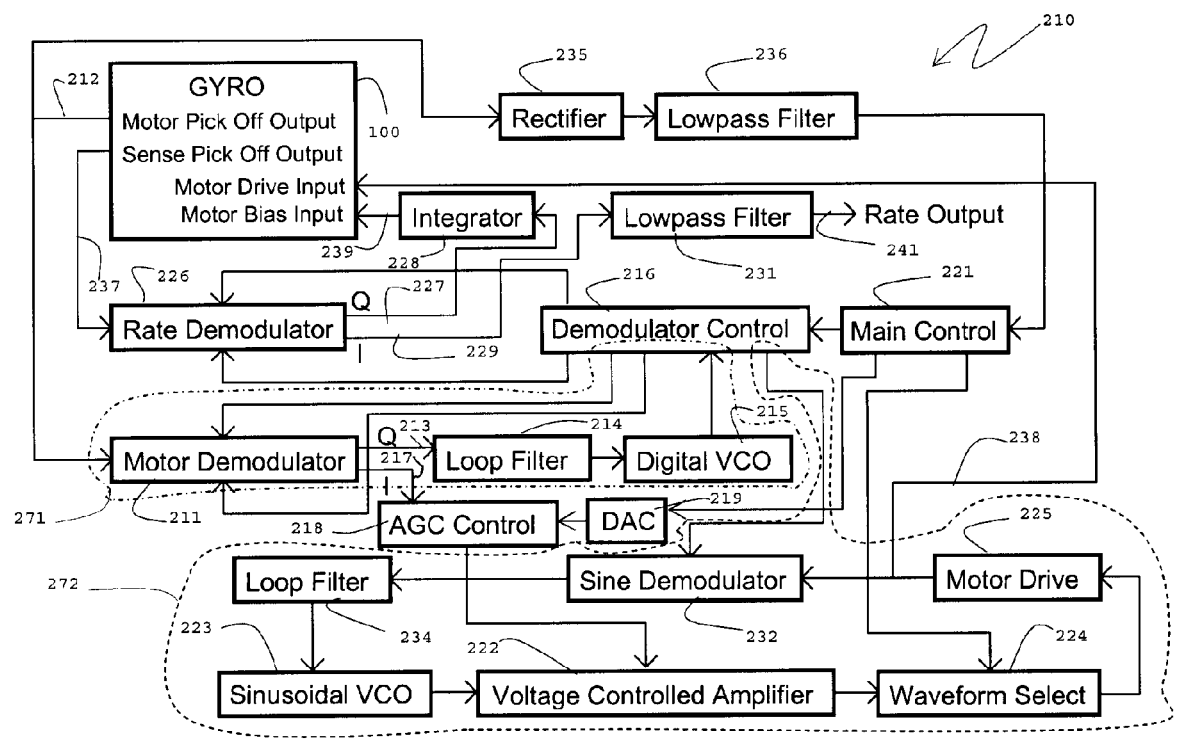
FIG. 17 is a block diagram of another version of the control electronics for the gyroscope.

FIG. 17 is another block diagram of a circuit 210 implementing the invention. Circuit 210 may use a high purity sine wave for the motor drive to reduce the noise level in the gyroscope 100 control system. One may start where the motor pick-off signal 212 comes from a gyro 100 and goes to the synchronous motor demodulator 211. The quadrature output 213 of the motor demodulator 211 may act as the phase detector in a phase locked loop (PLL). From the phase detector, the signal may go through a loop filter 214 and then to the digital voltage controlled oscillator 215, which provides the clock signal for the microcontroller (demodulator control) 216 that provides demodulator signals. The combination of the demodulator 211, the loop filter 214, and the VCO 215 may operate as a phase locked loop. Since the loop filter 214 is an integrator, it may be the kind of phase locked loop that has no steady state phase error even if the frequency of the motor is not the same as the free running frequency of the voltage controlled oscillator 215. (The free running frequency in this case could be considered the frequency that is present when the integrator is shorted out, which is something that a main microcontroller 221 is capable of arranging.) The microcontroller 216 therefore may provide a nearly perfect set of demodulator signals that even compensate for the delays in the switches. The in-phase output 217 of the motor demodulator 211 may generate a DC signal that represents the amplitude of a motor drive signal 238. The automatic gain control (AGC) 218 may compare the DC signal from the demodulator to a DC signal from a digital to analog converter (DAC) 219 that the main microcontroller 221 adjusts and the integral of the difference may be used to change the gain of the voltage controlled amplifier (VCA) 222. The signal from the sine wave oscillator (sine osc) 223 may then be adjusted by the VCA 222 before going to the sine filter 224 and the motor drive 225. The AGC system 218 may thus insist on seeing a particular amplitude of the motor pick-off signal 212 and then adjust the amplitude of the motor drive signal 238 until the particular amplitude is achieved.

The sense pick-off signal 237 may come from the gyro 100 and go to the synchronous rate demodulator (rate demod) 226. The quadrature demodulation may provide a signal 227 that proceeds through the integrator 228 to provide a motor bias signal 239. The in-phase demodulation 229 may provide a signal which, when filtered by filter 231, is an output 241 that represents the rotation rate of the gyro 100.

To generate a sinusoidal motor drive signal 238, another phase locked loop may be used. The demodulator control (demod control) 216 may provide a set of switching signals that are at half the frequency or other fractional multiple of the frequency of the switching signals used for the demodulators 211, 226, 232. The switching signals may also have a proper timing relationship to the other switching signals so that the sine wave that is created for the motor drive bears the proper relationship to the signals which come from the gyro 100. The sine demodulator 232, the loop filter 234, and the sinusoidal VCO 223 may constitute this second phase locked loop.

The signal 212 from the motor pick off may also go to a rectifier 235 and a lowpass filter 236 and then to an analog-to-digital converter on the main microcontroller 221. The rectifier circuit 235 may be used during start-up to detect when the signal has built up to an amplitude sufficient for the phase locked loops to lock properly. To get started, the main microcontroller 221 may instruct the another microcontroller (which may be controlled by the main microcontroller) to send a digital signal to the waveform select switch 224 to connect a signal from the main microcontroller 221 to the motor drive 225 rather than connecting the sine wave to the motor drive. The main microcontroller 221 may then generate a signal that has three levels and resembles a sine wave to the extent that this is possible when using only three levels. An algorithm may be used to stimulate the sensor with a series of tone bursts of different frequencies. Once the proof mass in the gyro 100 starts vibrating, a comparator may convert the signal into a square wave and the main microcontroller 221 may use this for synchronization. By properly adjusting the phase of the motor drive signal 238 with respect to the motor pick off signal 212, the microcontroller may be able to drive the sensor up to a significant amplitude. The main microcontroller 221 may then measure the frequency of the signal and use this information to adjust the pulse widths of the motor drive signal 238. With both the phase and the pulse width ideally suited to the frequency of the sensor, the main microcontroller 221 may then be able the drive the sensor up to as large an amplitude as is appropriate. The microcontroller 221 may then lock both of the phase locked loops and instruct the other microcontroller to use the waveform select switch 224 to change to the sinusoidal drive.

A reason why the main microcontroller 221 does not control the waveform select switch 224 itself but rather instructs the other microcontroller to do so is that there is another use for the waveform select switch 224. For this other purpose, the main microcontroller 221 may provide a DC level at ground instead of a waveform. The waveform select circuit 224 may then be used to choose between the sine wave and ground on alternate cycles of the motor drive signal 238 and this is why the waveform select signal comes eventually from the demodulation control 216 instead of the main microcontroller 221. The main microcontroller may instruct the other microcontroller when to use this mode of operation, but the other microcontroller may generate all the demodulation signals along with the cycle skipping signal once it is instructed to use this mode. A reason why this is done is that the second harmonic of the motor drive signal 238 waveform could be demodulated by the rate demodulator 226 in such a way as to create an error in the rate output signal. Since the rate demodulator 226 demodulates the signal 237 only when the motor drive 225 is turned off, this problem may be eliminated. Without this capability, the requirements for suppressing the second harmonic of the motor drive 238 waveform may be so severe that such suppression may be difficult to achieve reliably.

Figure 18:
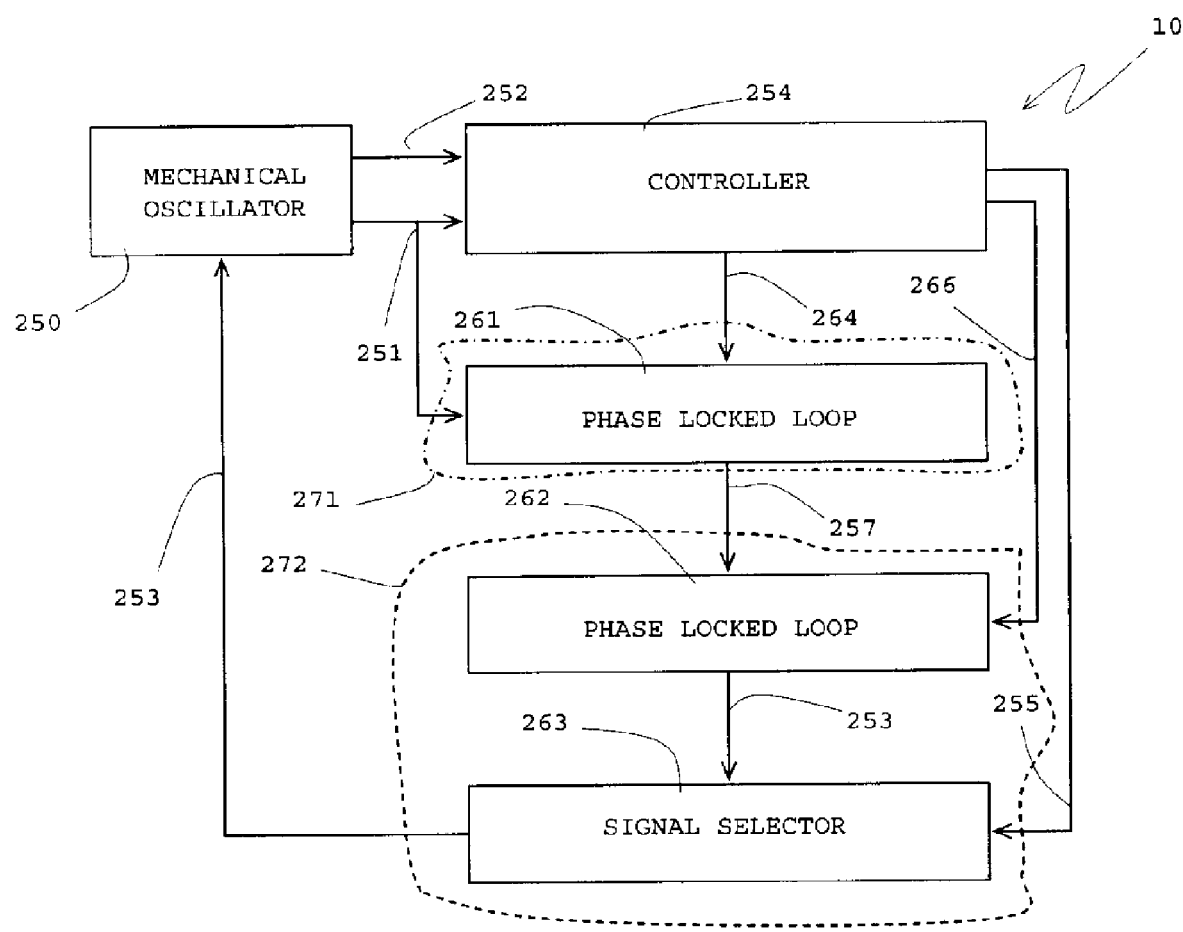
FIG. 18 is a basic diagram of loop electronics of the gyroscope control system.

The driving waveform to a MEMS vibratory gyroscope (or mechanical oscillator) 250 of FIG. 18 generally was not a sine wave to begin with. Plus, trying to drive a proof mass of the gyro with a driving signal at its resonant frequency may be a problem involving a high amount of ringing because of a high Q circuit that would result. Further, a pick off of the sense rate 251 would not be easy to obtain, or distinguish, if at all. The solution may be driving the gyro motor (i.e., the vibratory proof mass or mechanical oscillator) 250 with a smooth 5 KHz sine wave that is in proper phase and registration with a 10 kHz vibratory rate of the gyro motor.

To start, one may look at the motor pick off 251 for a synch signal for a motor drive signal 253. A sense pick off 252 may be an output indicating the gyro's rotation rate relative to the earth's surface or some aspect of the universe.

For a drive signal 253, a smooth sine wave may be needed and obtained from an oscillator. This signal should be at one-half of the motor frequency, i.e., 5 kHz, and be phase locked to the 10 kHz motor pick off signal 251. Also, the instruction clock of the microcontroller 254 may be locked on to the motor pick off signal 251 so that an edge between the instruction signals occurs at the edge or end of a cycle of the motor drive signal 253. There may be a voltage controlled oscillator (VCO) for controlling the clock of the microcontroller 254 so that the edges of the instruction signals each occur at the edge of a cycle of the motor pick off signal. This is for getting a maximum effect of an electrostatic push of the drive signal upon the proof mass of the gyro 250.

The drive signal 253 may be at a frequency of 5 kHz and synched to the sensed signal at 10 kHz of the proof mass vibration of the gyro 250 to minimize any second harmonics that may occur. The gyro may be driven with a sine wave 253 of 5 kHz to better distinguish it from any second harmonics that occur. However, a pure sine wave without any harmonics could still result in harmonics occurring because of comb-like drive elements on both sides of the proof mass may not be quite identical to each other and thus result in a slightly asymmetrical driving force on the proof mass of the gyro 250.

A control signal 255 from a microcontroller 254 may enable blanking out the drive signal 253 while the sense signal 252 (having rate of rotation information of the gyro) is being read from the gyro 250. Blanking may involve one or more cycles of the drive signal 253 being zeroed out. For example, every other cycle may be blanked out. Or every other two cycles may be blanked out. The microcontroller 254 may be programmed to permit any number of drive signals to the gyro 250 and to blank any number of the drive signals 253. The switch or blanker circuit 263 may be regarded as a signal selector. At least a portion of the signal selector may be outside of the microcontroller 254.

Five kHz may be a good frequency since the drive mechanism of the gyro 250 can be neutral to the polarity of the drive signal 253 in terms of attraction forces to drive the gyro.

The 10 kHz resonance of the gyro proof mass and corresponding motor pick off signal 251 may be regarded as a master clock for the drive and sense system of the gyro. The sense pick off signal 252 may have an amplitude that is indicative of a magnitude of rate of rotation of the gyro. So at no rotation, the amplitude may be theoretically zero. Thus, with a need to determine the magnitudes of very small amplitude signals with reasonable accuracy, the drive signal 253 should be blanked out during a sense pick off signal 252 reading.

The system 10 for driving and sensing of the gyro is essentially analog but it may be digitized. The latter may require analog to digital converters (ADC's) for receiving analog inputs from the motor pick off 251 and the sense pick off 252. The digital process may convert signals at 96 thousand samples per second with a 24 bit resolution. The digitized system may operate to the precision of floating point accuracy, and be implemented with a digital signal processor (DSP).

There may be some difference frequencies in a phase locked loop output signal so a filter may be needed to eliminate these frequencies and yet retain the fundamental frequency. Also, changing the frequency of the signal within a cycle may cause distortion, so the frequency should be changed or adjusted at an edge or end of a cycle of the signal.

Of switching signals from the controller 254, some may be at 10 KHz and others at 5 kHz. These signals may be aligned "perfectly" with the 10 kHz signal from the motor pick off 252, which may be regarded as the primary master clock.

A 5 kHz signal 257 may be provided from the first loop 261 to a second loop. The second loop 262 may be tied in with a sine oscillator to provide a sine wave signal at 5 kHz which is locked to or in "perfect" registration with the 5 kHz signal from the first loop 261.

The first phase locked loop signal may be keyed on the motor pick off signal 251. From this loop 261 may come switching signals of 5 kHz and 10 kHz. A 5 kHz signal 257 may go to the second phase locked loop 262 that provides the sine wave signal 253 to drive the gyro. Blanking may come in at the end of the circuit but just before the signal 253 goes to the motor drive input. The blanking may be triggered by an output from the controller 254. A first microprocessor may send a signal indicating a skip or non-skip mode to a second microprocessor associated with the first phase locked loop. The second processor may then provide a signal 255 to a blanking circuit 263 to blank the drive circuit at times during a reading of the sense signal 252 from the gyro.

The sine wave signal 253 from the second loop 262 may have a smoothness that is provided by three stages of low pass filters. The output may go through an inverter and then to the input as a feedback signal to the sine wave oscillator in the second loop.

The main microcontroller 254 may control switches in synch with the incoming motor pick off signal 251. The phase locked loop output signals 257 and 253 may also be in synch with the pick off signal 251. Being in synch here may mean that the edges of the signals are aligned with each other and aligned with a cross-over point of a zero crossing signal such as a sine wave. For example, a change of frequency should occur at an edge or a cross-over point. There is nothing that should be changed or switched in the middle of a full clock cycle or half cycle. This approach may avoid jitter among the signals.

Voltage controlled oscillators may be parts of the phase locked loops 261 and 262. When the loop locks, the clock signal may be aligned with a significant event such as an incoming motor pick off signal from the gyroscope. The pick off signal may be the master clock signal. The clock of the main controller 254 may be keyed to the pick off signal 251.

Switch delays may be compensated for, whether open or closed. This may be accomplished by the phase locked loop. In this way, the first phase locked loop 261 may compensate for the average delay of the switches. The microcontroller or phase locked loop may generate a 10 kHz switch signal and a 5 kHz switch signal which may be square wave signals 265 and 266, respectively. The 5 kHz signal 266 may be input to the second phase locked loop. The generated sine wave from an output signal 253 of the second phase locked loop 262 may be in synch and in registration with the switch signals.

Figure 19:
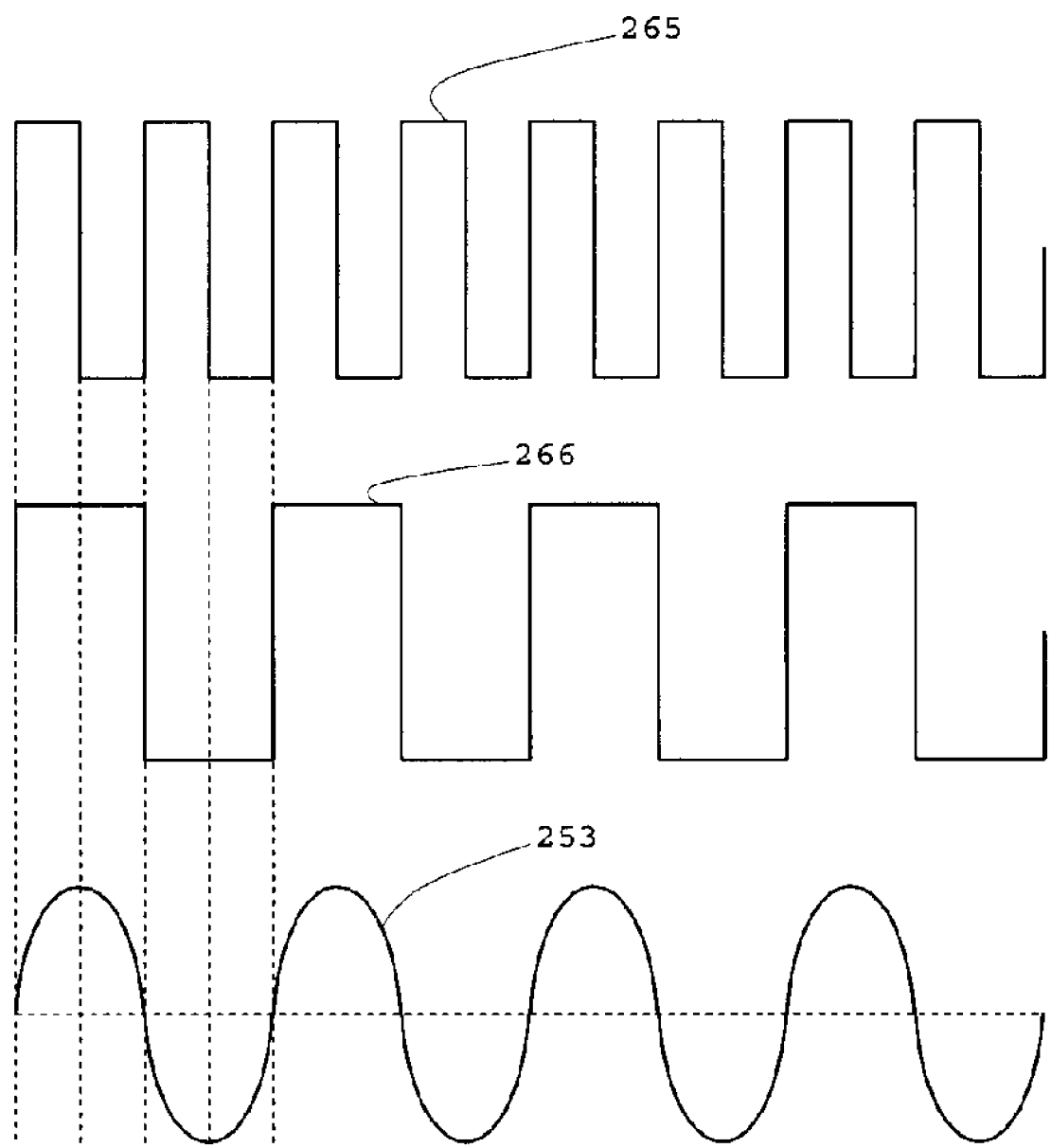
FIG. 19 shows a relationship among some of the signals in the system.

It follows that the 5 kHz signal 265 may be also properly registered with the 10 kHz signal 266 (i.e., it may be like being in phase but also aligned at the respective edges and/or cross-points of the respective wave forms. The edges of signals 265 and 266 may be aligned with each other and the cross-over point of sine wave 253, as in FIG. 19. The position of one wave relative to a position of another wave of each signal may indicate whether the signals are properly registered relative to each other. The encircled circuitry 271 of a first loop in FIG. 17 may correspond to the circuitry 271 of the loop in the block diagram of FIG. 18. Similarly, the encircled circuitry 272 of a second loop in FIG. 17 may correspond to the circuitry 272 of the loop with the signal selector in the block diagram of FIG. 18.

Figure 20:
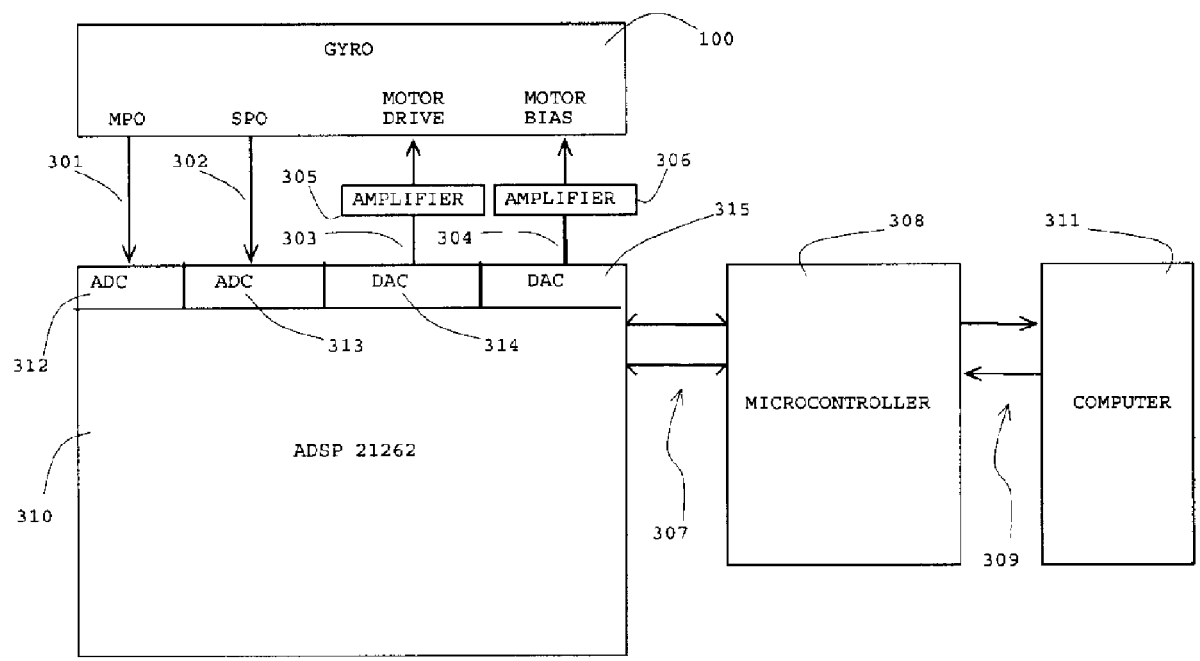
FIG. 20 is a block diagram of an extended digital version having a digital signal processor for the control electronics of the mechanical oscillator or gyroscope.

FIG. 20 reveals a digital version of the control electronics for the mechanical oscillator 250 or gyroscope 100. A motor pick-off output 301 of gyro 100 may be connected to an analog-to-digital converter (ADC) 312 of a digital signal processor (DSP) 310, which may be a model ADSP 21262, as an example, made by Analog Devices, Inc., of Norwood, Mass. A sense pick-off output 302 gyro 100 may be connected to an analog-to-digital converter 313 of the digital signal processor 310. A motor drive output 303, which includes a digital-to analog converter, of DSP 310 may be connected via an amplifier 305 to a motor drive input of gyro 100. The motor or oscillator drive signal may be a digitally generated synthetic sinusoidal or sine wave signal having a fractional multiple frequency of the sense pick off signal of the motor or oscillator and being in sync and/or in registration with the motor pickoff signal. The drive signal may be of another waveform as desired and generated by the DSP. The delays or timing of various switching, as needed, may be digitally compensated for or determined by the DSP. A motor bias output 304 of DSP 310 may be connected via an amplifier 306 to a motor bias input of gyro 100. There may be an eight-bit bi-directional data bus 307 connected between DSP 310 and a microcontroller 308. There may be an RS 232 interface connection 309 between the microcontroller 308 and a computer 311.

Figure 21:
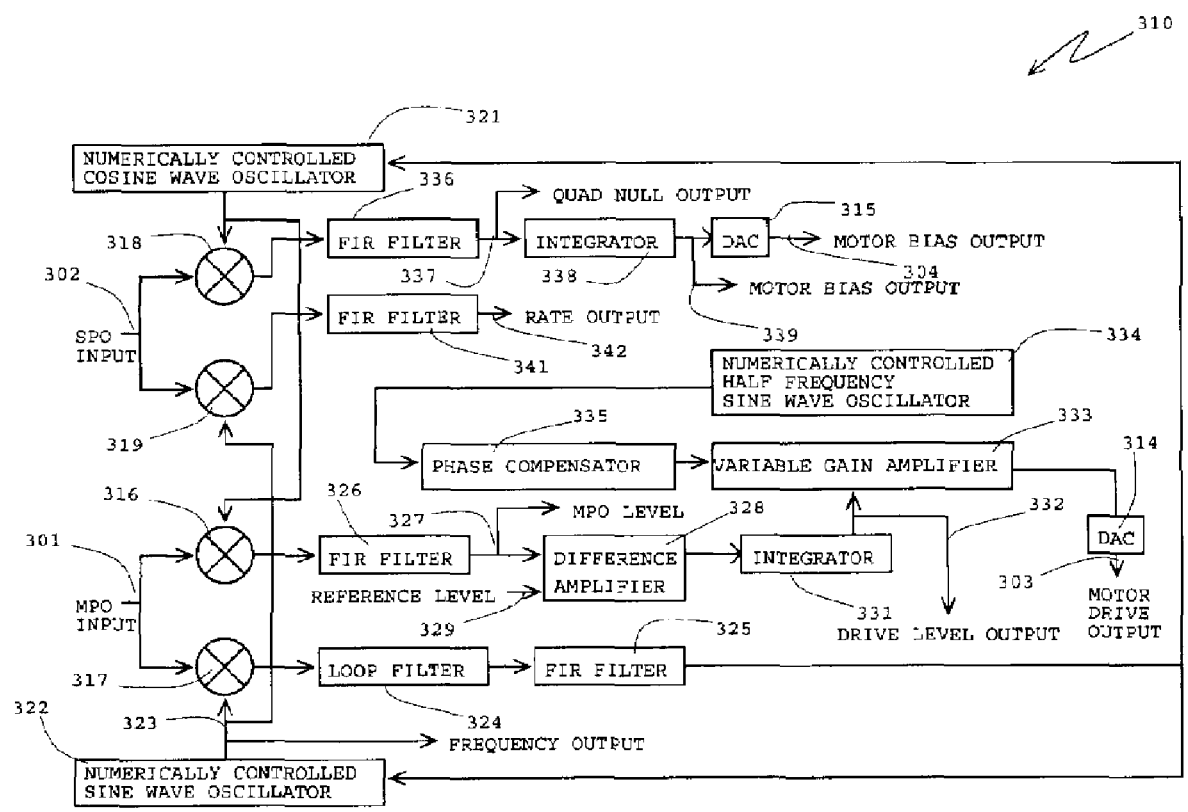
FIG. 21 is a diagram of the digital signal processor for the control electronics.

FIG. 21 is a schematic of the DSP 310. The motor pick-off signal output 301 of gyro 100 may go via the ADC 312 to multipliers 316 and 317. The motor sense pickoff output 302 of gyro 100 may go via the ADC 313 to multipliers 318 and 319. A numerically controlled cosine wave oscillator 321 may have an output connected to multipliers 318 and 316. A numerically controlled sine wave oscillator 322 may have a frequency output 323 connected to multipliers 317 and 319. An output of multiplier 317 may go to a loop filter 324. An output of loop filter 324 may go to a finite impulse response (FIR) filter 325. An output of filter 325 may go to the numerically controlled cosine wave oscillator 321 and to the numerically controlled sine wave oscillator 322.

An output of multiplier 316 may go to a FIR filter 326. Filter 326 may have motor pickoff level output 327 connected to an input of a difference amplifier 328. Also, an input to the difference amplifier may be a reference level 329. An output of difference amplifier 328 may go to an integrator 331. A drive level output 332 from integrator 331 may go to a variable gain amplifier 333. A numerically controlled half frequency (or other fractional multiple frequency) sine wave oscillator 334 may have an output connected to a phase compensator 335. An output of the phase compensator 335 may go to the variable gain amplifier 333. An output of the variable gain amplifier may go the DAC 314 which in turn may provide the motor drive output 303.

An output of multiplier 318 may go to a FIR filter 336. The FIR filter 336 may provide a quad null output 337 to an integrator 338. A motor bias output 339 may got to the DAC 315 which in turn may provide the analog motor bias output 304 for gyro 100 via the amplifier 306. An output of multiplier 319 may go to a FIR filter 341. FIR filter 341 may provide a rate output 342.

Numerical outputs of DSP 310 may be communicated digitally to microcontroller 308 and computer 311 via data bus 307 and interface 309. These outputs may include frequency output 323, motor pick-off level 327, drive level output 332, quad level output 337, motor bias output 339, and rate output 342.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A mechanical oscillator control system comprising:
a first phase locked loop connected to a mechanical oscillator pick off; and
a second phase locked loop connected to an output of the first phase locked loop;
wherein the second phase locked loop may output a sinusoidal wave signal having a fractional multiple frequency of a signal from the mechanical oscillator motor pick off;
a demodulator connected to a mechanical oscillator sense pick off; and
a switch connected to an output of the second phase locked loop and to a drive input of the mechanical oscillator.

2. The system of claim 1, wherein the sinusoidal wave signal and the signal from the mechanical oscillator pick off are registered relative to each other.

3. The system of claim 2, wherein an edge or cross-over point of the sinusoidal wave signal coincides with an edge or cross-point of the signal from the mechanical oscillator pick off.

4. The system of claim 1, further comprising:
a controller connected to the demodulator and to the switch; and
wherein:
the switch is closed so that the second phase locked loop may provide the sinusoidal wave signal to the drive input of the mechanical oscillator; and
the switch may be opened so that the demodulator can read a signal from the mechanical oscillator sense pick off.

5. The system of claim 4, wherein an output signal of the first phase locked loop has an edge that coincides with an edge of a signal from the mechanical oscillator pick off.

6. The system of claim 5, further comprising:
a plurality of switches; and
wherein the switches are actuated at an edge or cross-over point of the sinusoidal wave signal.

7. The system of claim 6, wherein instructions of the controller may cycle at an edge or cross-over point of the sinusoidal wave signal.

8. A method for sinusoidal mechanical oscillator control comprising:
   picking off a first signal having a first frequency from a mechanical oscillator;
   providing a second signal having a second frequency that is a fraction of the first frequency, and is phase locked to the first signal;
   providing sinusoidal wave signal that is phase locked to the second signal;
   providing the sinusoidal wave signal to a drive input of the mechanical oscillator;
   picking off a sense signal from the mechanical oscillator; and
   demodulating the sense signal to obtain a sensed parameter.

9. The method of claim 8, further comprising assuring that the sinusoidal wave signal is in registration with the first signal in that an edge or cross-over point of the sinusoidal wave signal is aligned in time with an edge or cross-over point of the first signal.

10. The method of claim 8, further comprising switching off the sinusoidal signal to the drive input of the mechanical oscillator when demodulating the sense signal.

11. The method of claim 10, wherein the mechanical oscillator is a vibratory mass gyroscope.

12. The method of claim 10, wherein the mechanical oscillator is fabricated with MEMS technology.

13. A gyroscope control system comprising:
   a first phase locked loop connected to a first output of the gyroscope;
   a second phase locked loop connected to an output of the first phase locked loop;
   a signal selector connected to an output of the second phase locked loop and to an input of the gyroscope
   a demodulator connected to a second output of the gyroscope; and
   wherein:
      the demodulator occasionally reads a gyroscope rotation rate from a signal from the second output of the gyroscope; and
      the signal selector prevents a signal from the output of the second phase locked loop from going to the input of the gyroscope when the demodulator reads a gyroscope rotation rate from a signal of the second output of the gyroscope.

14. The system of claim 13, wherein:
   the first or second output of the gyroscope is a pick off signal having a frequency f;
   the output of the first phase locked loop is a signal at a frequency f/2 which is phase locked to the pick off signal; and
   the output of the second phase locked loop is a sine wave at a frequency f/2 phase locked to the signal at the output of the first phase locked loop.

15. The system of claim 13, wherein:
   the first output of the gyroscope may provide a pick off signal; and
   the input of the gyroscope may receive a driver signal for the gyroscope.

16. The system of claim 15, wherein:
   the first phase locked loop comprises:
      a phase detector connected to the first output of the gyroscope;
      a loop filter connected to the phase detector; and
      a voltage controlled oscillator connected to the loop filter and to the second phase locked loop; and
   the second phase locked loop comprises:
      a phase detector connected to an output of the voltage controlled oscillator;
      a loop filter connected to the phase detector; and
      a sinusoidal voltage controlled oscillator connected to the loop filter and to the signal selector.

17. The system of claim 16, wherein:
   the output of the first phase locked loop may provide first and second signals locked to signals of the first output of the gyroscope;
   the first signal has a frequency of f; and
   the second frequency has a frequency of f/2.

18. The system of claim 17, wherein:
   the first signal is a first switch signal;
   the second signal is a second switch signal; and
   each of the first and second switch signals has an edge that coincides with an edge of the gyroscope pick off signal.

19. The system of claim 18, wherein the sine wave has a cross-over point that coincides with the edge of the gyroscope pick off signal.

20. The system of claim 19, further comprising:
   a controller connected to the demodulator and the signal selector; and
   wherein the controller provides a signal to the signal selector to blank out the output of the second phase locked loop going to the input of the gyroscope when the demodulator reads a gyroscope rotation rate from the signal of the second output of the gyroscope.

* * * * *